United States Patent
Gomi et al.

(10) Patent No.: US 9,757,860 B2
(45) Date of Patent: Sep. 12, 2017

(54) ROBOT

(71) Applicant: Seiko Epson Corporation, Tokyo (JP)

(72) Inventors: Akihiro Gomi, Fujimi (JP); Masaki Motoyoshi, Shiojiri (JP); Shunsuke Toshimitsu, Azumino (JP); Akio Niu, Matsumoto (JP); Atsushi Asada, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/556,800

(22) Filed: Dec. 1, 2014

(65) Prior Publication Data

US 2015/0151432 A1 Jun. 4, 2015

(30) Foreign Application Priority Data

Dec. 2, 2013 (JP) ................................. 2013-248935
Feb. 13, 2014 (JP) ................................. 2014-025127

(51) Int. Cl.
G05B 19/00 (2006.01)
B25J 9/16 (2006.01)

(52) U.S. Cl.
CPC ... B25J 9/1641 (2013.01); *G05B 2219/37134* (2013.01); *G05B 2219/39195* (2013.01); *Y10S 901/09* (2013.01); *Y10S 901/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,049,797 A | * | 9/1991 | Phillips | B25J 9/1635 318/568.16 |
| 5,130,632 A | * | 7/1992 | Ezawa | B25J 9/1674 318/568.11 |
| 5,528,955 A | * | 6/1996 | Hannaford | B25J 9/047 318/568.1 |
| 6,604,021 B2 | * | 8/2003 | Imai | G06N 3/008 318/568.11 |
| 7,756,606 B2 | | 7/2010 | Nakajima et al. | |
| 7,765,023 B2 | | 7/2010 | Oaki et al. | |
| 8,541,970 B2 | * | 9/2013 | Nowlin | B25J 9/1682 318/560 |
| 8,798,795 B2 | | 8/2014 | Igarashi et al. | |
| 8,831,781 B2 | | 9/2014 | Igarashi et al. | |

(Continued)

FOREIGN PATENT DOCUMENTS

| | | |
|---|---|---|
| JP | 01-173116 | 7/1989 |
| JP | 06-143172 | 5/1994 |

(Continued)

*Primary Examiner* — Jonathan L Sample
(74) *Attorney, Agent, or Firm* — Harness, Dickey & Pierce, P.L.C.

(57) ABSTRACT

A robot includes a plurality of joints including a first joint and a second joint that rotates in a direction different from a rotation direction of the first joint, a plurality of arm members including a first arm member provided to be rotatable with respect to a base via the first joint, and a first angular velocity sensor provided in the first arm member or the first joint. A first inertial sensor is provided in the first arm member (or a portion that rotates together with the first arm member in the first joint). The plurality of joints are controlled on the basis of an output of the first inertial sensor.

9 Claims, 26 Drawing Sheets

(56) References Cited

U.S. PATENT DOCUMENTS

| | | | |
|---|---|---|---|
| 2004/0133308 A1* | 7/2004 | Kato | G06N 3/008 700/245 |
| 2005/0179416 A1* | 8/2005 | Iribe | B25J 9/1674 318/563 |
| 2006/0248964 A1* | 11/2006 | McCoy, Jr. | B25J 13/088 73/862 |
| 2007/0220637 A1* | 9/2007 | Endo | B25J 9/161 318/568.17 |
| 2007/0288124 A1* | 12/2007 | Nagata | B25J 9/1694 700/258 |
| 2009/0149993 A1* | 6/2009 | Neki | B62D 57/032 700/254 |
| 2009/0272585 A1* | 11/2009 | Nagasaka | B25J 9/1633 180/8.6 |
| 2010/0154117 A1* | 6/2010 | Odashima | A61G 7/1017 5/87.1 |
| 2010/0318223 A1* | 12/2010 | Motoyoshi | B25J 9/1638 700/253 |
| 2010/0332032 A1* | 12/2010 | Moriyama | B25J 9/1682 700/258 |
| 2011/0004343 A1* | 1/2011 | Iida | B25J 9/1638 700/253 |
| 2012/0010748 A1* | 1/2012 | Sasai | B25J 9/1674 700/254 |
| 2012/0035763 A1* | 2/2012 | Motoyoshi | B25J 9/1694 700/258 |
| 2012/0179294 A1* | 7/2012 | Sasai | B25J 9/1694 700/254 |
| 2012/0215357 A1* | 8/2012 | Igarashi | B25J 9/1641 700/258 |
| 2012/0277912 A1* | 11/2012 | Kirihara | B25J 9/1653 700/258 |
| 2013/0073086 A1* | 3/2013 | Motoyoshi | G05B 15/00 700/258 |
| 2013/0116827 A1* | 5/2013 | Inazumi | B25J 9/1612 700/260 |
| 2013/0310973 A1 | 11/2013 | Tanaka et al. | |
| 2014/0060233 A1 | 3/2014 | Gomi et al. | |
| 2014/0067118 A1 | 3/2014 | Gomi et al. | |
| 2014/0067119 A1 | 3/2014 | Gomi et al. | |
| 2014/0067120 A1 | 3/2014 | Gomi et al. | |
| 2014/0067125 A1* | 3/2014 | Niu | B25J 9/1638 700/258 |
| 2014/0214207 A1 | 7/2014 | Igarashi et al. | |
| 2014/0316574 A1 | 10/2014 | Igarashi et al. | |

FOREIGN PATENT DOCUMENTS

| | | |
|---|---|---|
| JP | 2005-193311 A | 7/2005 |
| JP | 2005-242794 A | 9/2005 |
| JP | 2011-042022 A | 3/2011 |
| JP | 2012-139762 A | 7/2012 |
| JP | 2012-171051 A | 9/2012 |
| JP | 2012-171052 A | 9/2012 |
| JP | 2013-099806 A | 5/2013 |
| JP | 2014-046401 A | 3/2014 |
| JP | 2014-046402 A | 3/2014 |
| JP | 2014-046403 A | 3/2014 |
| JP | 2014-046404 A | 3/2014 |

* cited by examiner

ROBOT

BACKGROUND

1. Technical Field

The present invention relates to a robot.

2. Related Art

There is known a robot including an arm in which a plurality of arm members are connected by joints. It is possible to cause the robot to perform various kinds of work by attaching a robot hand and the like to the distal end of the arm. However, when the robot hand or the like is moved to a target position and stopped in order to perform work, the work cannot be started because the distal end of the arm oscillates for a while.

Therefore, there has been proposed a technique for mounting an inertial sensor on the distal end side of an arm and suppressing oscillation of the arm by controlling movements of joints of the arm to reduce an output of the inertial sensor (JP-A-2005-242794 (Patent Literature 1)).

However, among robots including a large number of joints, there is a robot that moves a certain joint to thereby change the directions of rotation axes of the joints ahead of the joint. Even if the technique of Patent Literature 1 is applied to this robot, it is difficult to sufficiently suppress the oscillation of an arm.

This is because, when the distal end of the arm is oscillating, for example, since control contents (a control amount and a control direction) concerning a joint on the distal end side of the arm change according to a rotation position of a joint further on the root side (the base side) than the joint on the distal end side, control is complicated.

When the distal end of the arm is oscillating, usually, the rotation position changes every moment because oscillation occurs even in the joint on the root side. As a result, since the direction of the joint on the distal end side of the arm changes every moment, the control is more complicated. In addition, influences due to deformation of the joints and a machine error accumulate more toward the distal end of the arm. Therefore, if the technique of Patent Literature 1 is applied to the robot having the problems explained above, the oscillation is sometimes amplified to the contrary.

In this way, many problems are left to control oscillation of a robot including a plurality of joints having different directions of rotation axes.

SUMMARY

An advantage of some aspects of the invention is to solve at least a part of the problems described above, and the invention can be implemented as the following aspects or application examples.

APPLICATION EXAMPLE 1

A robot according to this application example includes: a plurality of joints including a first joint and a second joint that rotates in a direction different from a rotation direction of the first joint; a plurality of arm members including a first arm member provided to be rotatable with respect to a base via the first joint; and a first angular velocity sensor provided in the first arm member or the first joint.

Consequently, a movement of the first arm member attached to the base via the first joint can be detected from an output of the first angular velocity sensor. Therefore, since the other joints can be controlled taking into account an influence of a movement of the first joint between the first arm member and the base on movements of the other plurality of joints, it is possible to suppress oscillation of an arm of the robot. Further, since the movement of the first joint can be detected on the basis of the output of the first angular velocity sensor, it is possible to suppress accumulation of influences of errors toward the distal end side of the arm. Therefore, it is possible to suppress likelihood that the oscillation of the arm is amplified by controlling the joints.

APPLICATION EXAMPLE 2

In the robot according to the application example described above, a second angular velocity sensor may be provided in an arm member different from the first arm member among the plurality of arm members.

Consequently, since the joints can be controlled using an output of the second angular velocity sensor in addition to the output of the first angular velocity sensor, it is possible to further suppress the oscillation of the arm. If an output of one axis is used, since an arithmetic operation amount for the control decreases, it is possible to further suppress the oscillation of the arm.

APPLICATION EXAMPLE 3

In the robot according to the application example described above, the robot may further include a control unit configured to feedback-control, on the basis of an output of the second angular velocity sensor, the joint further on the base side than the arm member provided with the second angular velocity sensor.

Consequently, in the output of the second angular velocity sensor, not only a movement of the arm member provided with the second angular velocity sensor but also a movement of the joint further on the base side than the arm member appears. Therefore, if the joint on the base side is feedback-controlled on the basis of the output of the second angular velocity sensor, it is possible to further suppress the oscillation of the arm. Further, since the joint on the base side having large oscillation can be controlled, it is possible to more effectively suppress the oscillation of the arm.

APPLICATION EXAMPLE 4

In the robot according to the application example described above, the control unit may feedback-control, on the basis of the output of the second angular velocity sensor, the joint having a rotation axis in a direction coinciding with a direction of a rotation axis of the joint on the base side of the arm member provided with the second angular velocity sensor. Note that "having a rotation axis in a coinciding direction" is not limited to complete coincidence and may be substantial coincidence. Therefore, when the directions of the rotation axes are different in a range of ±5°, this falls under the case of "having a rotation axis in a coinciding direction" in this specification.

Consequently, naturally, the movement of the joint on the base side of the arm member provided with the second angular velocity sensor is reflected on the output of the second angular velocity sensor. However, when a joint having a rotation axis in a coinciding direction is also present further on the base side, a movement of the joint on the base side (the joint having the rotation direction in the direction coinciding with the direction of the rotation axis of the joint on the base side of the arm member provided with the second angular velocity sensor) is also reflected on the output of the second angular velocity sensor. In addition, the movement of the joint on the base side is amplified and reflected. Therefore, it the joint having the rotation axis in the direction coinciding with the direction of the rotation axis of the joint on the base side of the arm member provided with the second angular velocity sensor is feedback-controlled on the basis of the output of the second angular velocity sensor, since a joint other than the joint of the arm member provided on the second angular velocity sensor can be accurately controlled, it is possible to suppress the oscillation of the arm. Further, since the joint on the base side having large oscillation can be controlled, it is possible to more effectively suppress the oscillation of the arm.

APPLICATION EXAMPLE 5

A robot according to this application example includes: a plurality of joints including a first joint and a second joint that rotates in a direction different from a rotation direction of the first joint; a plurality of arm members coupled by the plurality of joints; a first angular velocity sensor provided in one of the plurality of arm members; and a second angular velocity sensor provided in the arm member different from the arm member provided with the first angular velocity sensor.

In such a robot, since the plurality of joints can be controlled on the basis of outputs of the first angular velocity sensor and the second angular velocity sensor, it is possible to quickly suppress oscillation of an arm of the robot. Consequently, since the oscillation of the arm can be quickly suppressed, even if rigidity of the arm (rigidity of the arm members and the joints) is low, it is possible to suppress the oscillation of the arm.

APPLICATION EXAMPLE 6

In the robot according to the application example described above, the robot may further include a control unit configured to control the plurality of joints on the basis of an output of one axis of the first angular velocity sensor and an output of one axis of the second angular velocity sensor.

Consequently, even when a plurality of angular velocity sensors are used, it is possible to suppress the oscillation of the arm of the robot with simple control. Further, since an arithmetic operation amount is suppressed by using an output of one axis, it is possible to perform high-speed control and suppress the oscillation or the arm.

APPLICATION EXAMPLE 7

In the robot according to the application example described above, the robot may further include a control unit configured to control the plurality of joints on the basis of an output of one axis of the first angular velocity sensor and outputs of three axes of the second angular velocity sensor.

If the second angular velocity sensor that uses outputs of three axes is attached to the arm member, the direction of a rotation axis of the joint of which changes, even when the direction of a rotation axis of a certain joint changes according to movements of the other joints, it is possible to control the plurality of joints and suppress the oscillation of the arm. Further, an arithmetic operation amount can be suppressed by using an output of one axis concerning the first angular velocity sensor. Accuracy of control can be secured by using outputs of three axes concerning the second angular velocity sensor. As a result, it is possible to further suppress the oscillation of the arm.

APPLICATION EXAMPLE 8

In the robot according to the application example described above, the control unit may feedback-control, on the basis of an output of the first angular velocity sensor, the joint further on the base side than the arm member provided with the first angular velocity sensor and feedback-control, on the basis of an output of the second angular velocity sensor, the joint further on the base side than the arm member provided with the second angular velocity sensor.

Consequently, a movement of a joint can be more sensitively detected by providing an angular velocity sensor in a position more distant from the base than the joint. Therefore, if the joint is feedback-controlled by the method explained above on the basis of the output of the first angular velocity sensor and the output of the second angular velocity sensor, it is possible to accurately control the joint and suppress the oscillation of the arm.

APPLICATION EXAMPLE 9

In the robot according to the application example described above, a rotation axis of the joint feedback-controlled on the basis of an output of the first angular velocity sensor and a rotation axis of the joint feedback-controlled on the basis of an output of the second angular velocity sensor may be orthogonal to each other.

Consequently, since the joints having the orthogonal rotation axes can be respectively independently controlled, the joints can be easily and accurately controlled. As a result, it is possible to easily and accurately control movements of the plurality of joints present in the arm and suppress the oscillation of the arm.

APPLICATION EXAMPLE 10

In the robot according to the application example described above, the first angular velocity sensor may be provided in the arm member closest to the base among the arm members having different rotation axes of the joints on both sides.

Consequently, since movements of the plurality of joints can be easily and accurately controlled, it is possible to suppress the oscillation of the arm.

APPLICATION EXAMPLE 11

In the robot according to the application example described above, an oscillation type gyro sensor may be used as the first angular velocity sensor.

Since the oscillation type gyro sensor can be reduced in size compared with gyro sensors of other types, it is possible to reduce the robot in size.

APPLICATION EXAMPLE 12

In the robot according to the application example described above in which the oscillation type gyro sensor is used as the first angular velocity sensor, an oscillation type gyro sensor including a piezoelectric material may be used as the first angular velocity sensor.

Among oscillation type gyro sensors, the oscillation type gyro sensor including the piezoelectric material (an oscillation type gyro sensor of a so-called piezoelectric system) can be further reduced in size than an oscillation type gyro sensor of an electrostatic system. Therefore, by using the oscillation type gyro sensor including the piezoelectric material as the first angular velocity sensor, it is possible to further reduce the robot in size.

APPLICATION EXAMPLE 13

A robot according to this application example includes: a plurality of joints including a first joint and a second joint that rotates in a direction different from a rotation direction of the first joint; a plurality of arm members coupled by the plurality of joints; an angular velocity sensor provided in one of the plurality of arm members; and a control unit configured to control, on the basis of an output of the angular velocity sensor, the joint having a direction of a rotation axis coinciding with a direction of a rotation axis of the joint on the base side of the arm member, which is provided with the angular velocity sensor, and provided on the base side.

In such a robot, since the joint having the direction of the rotation axis coinciding with the direction of the rotation axis of the joint on the base side of the arm member, which is provided with the angular velocity sensor, and provided further on the base side than the joint can be controlled on the basis of the output of the angular velocity sensor, it is possible to suppress oscillation of an arm using angular velocity sensors fewer than the joints. Since the joint on the base side having large oscillation can be controlled, it is possible to further suppress the oscillation of the arm.

APPLICATION EXAMPLE 14

A robot according to this application example includes: an arm including a first joint and a second joint that rotates in a direction different from a rotation direction of the first joint; an inertial sensor provided in the arm; and a control unit configured to control the first joint by sampling an output of the inertial sensor at a cycle equal to or higher than 100 Hz.

In such a robot, if a cycle for sampling the output of the inertial sensor is too late, when the arm is controlled, the arm more easily oscillates to the contrary. Therefore, if the cycle for sampling the output of the inertial sensor is set to 100 Hz or higher, it is possible to surely suppress the oscillation of the arm.

APPLICATION EXAMPLE 15

A robot according to this application example includes: an arm including a first joint and a second joint that rotates in a direction different from a rotation direction of the first joint; an inertial sensor provided in the arm; and a force sensor provided further on the distal end side of the arm than the inertial sensor.

In such a robot, since a plurality of joints can be controlled using not only an output of the inertial sensor but also an output of the force sensor, it is possible to surely suppress oscillation of the arm.

APPLICATION EXAMPLE 16

A robot according to this application example includes: an arm including a first joint provided on a base and a second joint that rotates in a direction different from a rotation direction of the first joint; and an inertial sensor provided in the arm. When the first joint is turned 90° at angular acceleration of 2200°/s$^2$, time until oscillation of the distal end of the arm changes from −0.05 mm to +0.05 mm is equal to or shorter than 1 second.

In such a robot, if the time until oscillation of the distal end of the arm changes from −0.05 mm to +0.05 mm is set to such time, it is possible to prevent actual harmful effects due to the oscillation of the arm.

APPLICATION EXAMPLE 17

A robot according to this application example includes: an arm including a first joint provided on a base and a second joint that rotates in a direction different from a rotation direction of the first joint; and an inertial sensor provided in the arm. When the first joint is turned 90° at maximum angular acceleration, time until oscillation of the distal end of the arm changes from −0.05 mm to +0.05 mm is equal to or shorter than 1 second.

APPLICATION EXAMPLE 18

A robot according to this application example includes: an arm including a first joint provided on a base and a second joint that rotates in a direction different from a rotation direction of the first joint; and an inertial sensor provided in the arm. When the first joint is turned 90° at angular acceleration of 2200°/s$^2$, time until oscillation of the distal end of the arm changes from −0.1 mm to +0.1 mm is equal to or shorter than 0.5 second.

APPLICATION EXAMPLE 19

A robot according to this application example includes: an arm including a first joint provided on a base and a second joint that rotates in a direction different from a rotation direction of the first joint; and an inertial sensor provided in the arm. When the first joint is turned 90° at maximum angular acceleration, time until oscillation of the distal end of the arm changes from −0.05 mm to +0.05 mm is equal to or shorter than 1 second.

In the robot according to the application example described above, it is possible to prevent actual harmful effects due to the oscillation of the arm.

The robot according to the application example described above may be configured as an aspect in which a control device that control the robot is used. That is, a control device according to an aspect is a control device for a robot including: a plurality of joints including a first joint and a second joint that rotates in a direction different from a rotation direction of the first joint; a plurality of arm members including a first arm member provided to be rotatable with respect to a base via the first joint; and a first angular velocity sensor provided in the first arm member or the first joint, wherein the control device includes a control unit configured to feedback-control, on the basis of an output of the second angular velocity sensor, the joint further on the base side than the arm member provided with the second angular velocity sensor.

Alternatively, the control device may be configured as a control device for a robot including: a plurality of joints including a first joint and a second joint that rotates in a direction different from a rotation direction of the first joint; a plurality of arm members coupled by the plurality of joints; a first angular velocity sensor provided in one of the plurality of arm members; and a second angular velocity sensor provided in the arm member different from the arm member provided with the first angular velocity sensor, wherein the control device includes a control unit configured to control the plurality of joints on the basis of an output of one axis of the first angular velocity sensor and outputs of one axis or three axes of the second angular velocity sensor.

Alternatively, the control device may be configured as a control device for a robot including: a plurality of joints including a first joint and a second joint that rotates in a direction different from a rotation direction of the first joint; a plurality of arm members coupled by the plurality of joints; and an angular velocity sensor provided in one of the plurality of arm members, wherein the control device includes a control unit configured to control, on the basis of an output of the angular velocity sensor, the joint having a direction of a rotation axis coinciding with a direction of a rotation axis of the joint on the base side of the arm member, which is provided with the angular velocity sensor, and provided on the base side.

Alternatively, the control device may be configured as a control device for a robot including: an arm including a first joint and a second joint that rotates in a direction different from a rotation direction of the first joint; an inertial sensor provided in the arm; and an angle sensor configured to detect an angle of the first joint, wherein the control device includes a control unit configured to control the first joint by sampling outputs of the inertial sensor and the angle sensor at a cycle equal to or higher than 100 Hz.

Alternatively, the control device may be configured as a control device for a robot including: an arm including a first joint and a second joint that rotates in a direction different from a rotation direction of the first joint; an inertial sensor provided in the arm; and a force sensor provided further on the distal end side of the arm than the inertial sensor, wherein the control device includes a control unit configured to control the plurality of joints on the basis of an output of the inertial sensor and an output of the force sensor.

Further, the robot according to the application example described above may be configured as an aspect in which the robot is used in a robot system. That is, a robot system according to an aspect is a robot system including: a robot; and a control device configured to control the robot, wherein the robot includes: a plurality of joints including a first joint and a second joint that rotates in a direction different from a rotation direction of the first joint; a plurality of arm members including a first arm member provided to be rotatable with respect to a base via the first joint; and a first angular velocity sensor provided in the first arm member or the first joint. The control device feedback-controls, on the basis of an output of the second angular velocity sensor, the joint further on the base side than the arm member provided with the second angular velocity sensor.

Alternatively, the robot system may be configured as a robot system including: a robot; and a control device configured to control the robot, wherein the robot includes: a plurality of joints including a first joint and a second joint that rotates in a direction different from a rotation direction of the first joint; a plurality of arm members coupled by the plurality of joints; a first angular velocity sensor provided in one of the plurality of arm members; and a second angular velocity sensor provided in the arm member different from the arm member provided with the first angular velocity sensor, and the control device controls the plurality of joints on the basis of an output of one axis of the first angular velocity sensor and outputs of one axis or three axes of the second angular velocity sensor.

Alternatively, the robot system may be configured as a robot system including: a robot; and a control device configured to control the robot, wherein the robot includes: a plurality of joints including a first joint and a second joint that rotates in a direction different from a rotation direction of the first joint; a plurality of arm members coupled by the plurality of joints; and an angular velocity sensor provided in one of the plurality of arm members, and the control device controls, on the basis of an output of the angular velocity sensor, the joint having a direction of a rotation axis coinciding with a direction of a rotation axis of the joint on the base side of the arm member, which is provided with the angular velocity sensor, and provided on the base side.

Alternatively, the robot system may be configured as a robot system including: a robot; and a control device configured to control the robot, wherein the robot includes: an arm including a first joint and a second joint that rotates in a direction different from a rotation direction of the first joint; an inertial sensor provided in the arm; and an angle sensor configured to detect an angle of the first joint, and the control device controls the first joint by sampling outputs of the inertial sensor and the angle sensor at a cycle equal to or higher than 100 Hz.

Alternatively, the robot system may be configured as a robot system including: a robot; and a control device configured to control the robot, wherein the robot includes: an arm including a first joint and a second joint that rotates in a direction different from a rotation direction of the first joint; an inertial sensor provided in the arm; and a force sensor provided further on the distal end side of the arm than the inertial sensor, and the control device controls the plurality of joints on the basis of an output of the inertial sensor and an output of the force sensor.

With the control device and the robot system described above, it is possible to suppress the oscillation of the arm and improve work efficiency of the robot.

First Aspect

A robot according to this aspect includes: a base; and an arm set on the base and including a plurality of arm members and an arm including three or more twisting joints capable of turning the arm member in a twisting direction with respect to the base or the other arm members. The arm includes an angular velocity sensor further on the base side than a third twisting joint counted from the base side among the three or more twisting joints.

When the angular velocity sensor is mounted at the distal end of the arm in this way, oscillation of the arm is sometimes amplified by control of a joint based on an output of the angular velocity sensor. As explained in detail below, likelihood of such wrong control is higher as the number of twisting joints interposed between the base and the angular velocity sensor is larger. Therefore, in the robot in this aspect, a position where the angular velocity sensor is mounted is limited to a position further on the base side than the third twisting joint of the arm. Consequently, the oscillation of the arm is not amplified by the control of the joint based on the output of the angular velocity sensor. It is possible to suppress the oscillation of the arm compared with when the control of the joint based on the output of the angular velocity sensor is not performed.

Second Aspect

In the robot according to the aspect described above, at least one bending joint turnable in a direction in which the arm member is bent with respect to the other arm members may be provided further on the base side than the third twisting joint in the arm.

Consequently, the arm is capable of taking, according to turning of the bending joint, various postures in which an axial direction of a rotation axis of a first twisting joint counted from the base side and axial directions of rotation axes of a second twisting joint and a third twisting joint counted from the base side are different.

Third Aspect

In the robot according to the aspect described above, the angular velocity sensor may be provided in the arm member connected to a second twisting joint counted from the base side among a three or more of the twisting joints of the arm.

Consequently, compared with when the angular velocity sensor is provided in the arm member connected to a first twisting joint counted from the base side, oscillation components of a large number of joints are included in an output of the angular velocity sensor. Since the plurality of joints can be controlled on the basis of an output of one angular velocity sensor, it is possible to more finely suppress the oscillation of the arm.

Fourth Aspect

In the robot according to the aspect described above, the angular velocity sensor may be provided in the arm member connected to the bending joint present further on the third twisting joint than a second twisting joint counted from the base side among a three or more of the twisting joints of the arm.

Consequently, in the arm including the bending joint further on the third twisting joint side than the second twisting joint, since oscillation of the bending joint can also be detected from the output of the angular velocity sensor, it is possible to suppress the oscillation of the arm by controlling the bending joint on the basis of the output of the angular velocity sensor.

Fifth Aspect

In the robot according to the aspect described above, the robot may further include a control unit capable of executing feedback control of the twisting joints and the bending joints on the basis of the output of the angular velocity sensor. The angular velocity sensor may be provided further on the third twisting joint side than all the joints feedback-controlled by the control unit among the twisting joints and the bending joints present further on the base side than the third twisting joint.

Consequently, oscillation of the feedback-controlled joints can be detected from the output of the angular velocity sensor. By feedback-controlling the joints on the basis of the output of the angular velocity sensor, it is possible to quickly suppress the oscillation of the arm compared with when the feedback control is not performed.

Sixth Aspect

In the robot according to the third aspect in which the angular velocity sensor is provided in the arm member connected to the second twisting joint, the robot may further include a control unit configured to feedback-control, on the basis of the output of the angular velocity sensor, the twisting joints and the bending joints present further on the base side than the angular velocity sensor.

Consequently, since oscillation components of the joints present between the base and the angular velocity sensor are included in the output of the angular velocity sensor, if the joint on the base side is feedback-controlled on the basis of the output of the angular velocity sensor, it is possible to quickly suppress the oscillation of the arm.

Seventh Aspect

In the robot according to the fourth aspect in which the angular velocity sensor is provided in the arm member connected to the bending joint present further on the third twisting joint side than the second twisting joint, the robot may further include a control unit configured to feedback-control the twisting joints and the bending joints present further on the base side than the angular velocity sensor.

Consequently, since oscillation components of the joints present between the base and the angular velocity sensor are included in the output of the angular velocity sensor, if the joint on the base side is feedback-controlled on the basis of the output of the angular velocity sensor, it is possible to quickly suppress the oscillation of the arm.

Eighth Aspect

In the robot according to the aspect described above, a first arm and a second arm may be provided on the base as the arm.

Consequently, as in the first aspect, in a double-arm robot in which the first arm and the second arm are provided on the base, it is possible to suppress oscillation of the arms.

Ninth Aspect

In the robot according to the aspect described above, a second angular velocity sensor may be provided on the base.

Consequently, in a robot in which the base is turnable with respect to a setting position of the robot, it is possible to suppress oscillation of the base by controlling a motion of the base on the basis of an output of the second angular velocity. Since the oscillation of the arm with respect to the base can be detected on the basis of the output of the angular velocity sensor provided in the arm and the output of the second angular velocity sensor provided on the base, the detection of the oscillation of the arm is less easily affected by the oscillation of the base. It is possible to quickly suppress the oscillation of the arm compared with when only the output of the angular velocity sensor of the arm is used.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
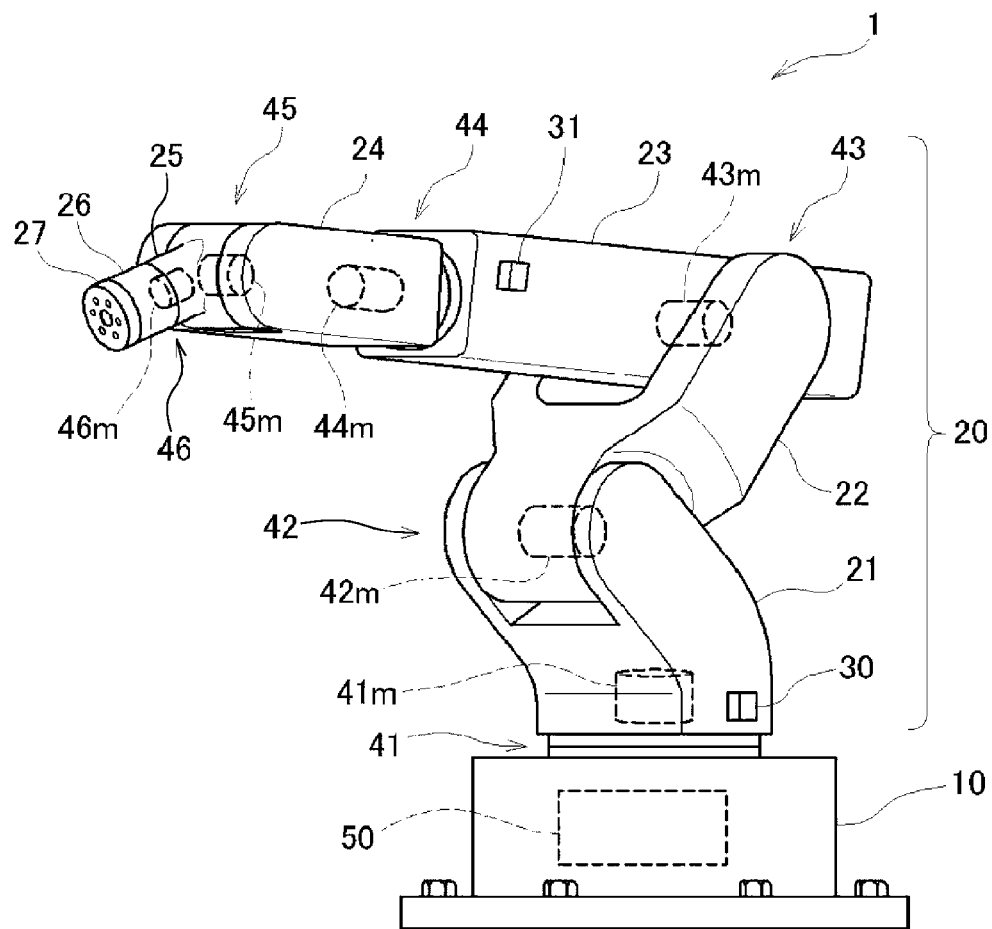
FIGS. 1A and 1B are explanatory diagrams showing the overall structure of a robot according to a first embodiment.
Figure 1B:
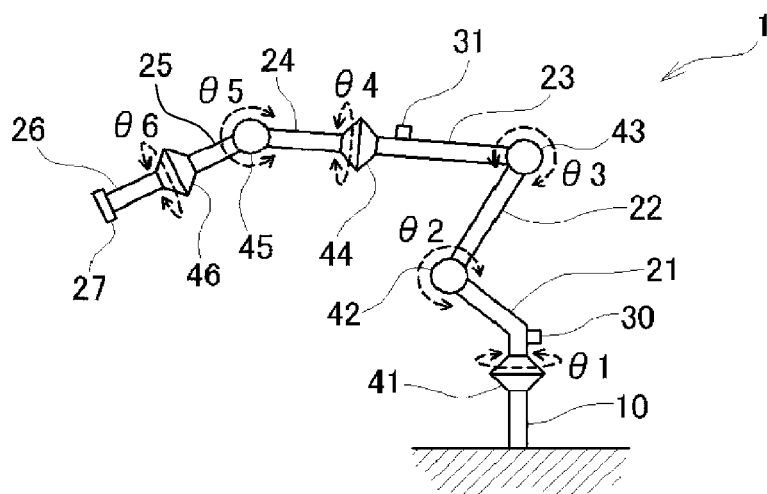

FIGS. 1A and 1B are explanatory diagrams showing the overall structure of a robot 1 according to a first embodiment. In FIG. 1A, a rough external shape of the robot 1 according to the first embodiment is shown.

As shown in the figure, the robot 1 according to the first embodiment includes a base 10 set on the ground, a joint 41 functioning as a first joint, an arm 20 rotatably attached to the base 10 via the joint 41, and a control unit 50 mounted in the base 10 and configured to control the operation of the entire robot 1.

The arm 20 includes six arm members 21, 22, 23, 24, 25, and 26 and five joints 42, 43, 44, 45, and 46.

The arm member 21 functioning as a first arm member is rotatably attached to the base 10 by the joint 41 functioning as the first joint. The arm member 22 is bendably attached to the arm member 21 by the joint 42 functioning as a second joint. The arm member 23 is bendably attached to the arm member 22 by the joint 43.

Further, the arm member 24 is rotatably attached to the arm member 23 by the joint 44. The arm member 25 is bendably attached to the arm member 24 by the joint 45. The arm member 26 is rotatably attached to the arm member 25 by the joint 46.

In the following explanation of the arm and the arm members, an end on the opposite side of a side where the base 10 is provided at the in an extending direction of the arm and the arm members is referred to as distal end (distal end side).

Note that not-shown various jigs (so-called end effectors) such as a robot hand (so-called hand section) and a welding jig are attached to the distal end of the arm member 26 via a force sensor 27. The force sensor 27 can detect the weights of the robot hand and the end effectors, the weight of a gripped workpiece, and the like.

Note that the robot 1 according to the first embodiment is a robot in which, when a certain joint is moved, the directions of rotation axes of joints ahead of the joint change (so-called vertical multi-joint robot).

In the portion of the joint 41 of the robot 1, a first motor 41m for driving a joint 41 is mounted. Similarly, in the portion of the joint 42, a second motor 42m for driving the joint 42 is mounted. In the portion of the joint 43, a third motor 43m for driving the joint 43 is mounted. In the portion of the joint 44, a fourth motor 44m for driving the joint 44 is mounted. In the portion of the joint 45, a fifth motor 45m for driving the joint 45 is mounted. In the portion of the joint 46, a sixth motor 46m for driving the joint 46 is mounted.

A gyro sensor 30 is attached to the arm member 21 attached to the base 10 among the six arm members 21 to 26. A gyro sensor 31 is attached to the arm member 23. The gyro sensors 30 and 31 are sensors capable of outputting angular velocities (or inertial forces) around predetermined three axes (an X axis, a Y axis, and a Z axis) set as rotation axes orthogonal to one another.

The gyro sensor 30 is attached in a direction in which a rotation axis of the joint 41 coincides with the Z axis of the gyro sensor 30. The gyro sensor 31 is attached in a direction in which a rotation axis of the joint 43 coincides with any one of the axes of the gyro sensor 31. Note that, in the explanation of this embodiment, it is assumed that angular velocity is detected as an inertial force. However, acceleration sensors may be used instead of the gyro sensors 30 and 31.

Note that, in this embodiment, the gyro sensor 30 corresponds to the "first angular velocity sensor" in the invention. The gyro sensor 31 corresponds to the "second angular velocity sensor" in the invention. The gyro sensors 30 and 31 also correspond to the "inertial sensor" in the invention. Further, the arm member 21 corresponds to the "first arm member" in the invention.

As a gyro sensor, an optical gyro sensor, an oscillation type gyro sensor, and the like are known. As the gyro sensors 30 and 31, the oscillation type gyro sensor formed using a thin film of a piezoelectric material is adopted because the oscillation type gyro sensor can be reduced in size.

It is difficult to reduce the optical gyro sensor in size because of a principle of using a Sagnac effect. The oscillation type gyro sensor can be reduced in size because the oscillation type gyro sensor detects angular velocity making use of a Coriolis force. As the oscillation type gyro sensor, a piezoelectric system, an electrostatic system, and the like are known. An oscillation type gyro sensor of the piezoelectric system that detects angular velocity using quartz or a thin film of a piezoelectric material other than quartz is small and can be manufactured inexpensively.

Note that the gyro sensors 30 and 31 that detect angular velocity is excellent in points explained below compared with an acceleration sensor that detects acceleration. First, the acceleration sensor needs to take into account the influence of the gravity. This is an error factor. On the other hand, the gyro sensors 30 and 31 do not need to take into account the influence of the gravity because the gyro sensors 30 and 31 detect angular velocity. The acceleration sensor is increased in size if it is attempted to improve detection sensitivity for acceleration. On the other hand, the gyro sensors 30 and 31 that detect angular velocity are capable of improving detection sensitivity even if the gyro sensors 30 and 31 are small. Therefore, a reduction in the size of the gyro sensors 30 and 31 can be attained. A degree of freedom of setting can be improved.

In FIG. 1B, a positional relation among the arm members 21 to 26, the joints 41 to 46, and the gyro sensors 30 and 31 included in the robot 1 according to the first embodiment is schematically shown.

As shown in FIG. 1B, an angle of the joint 41 is represented by rotation angle θ1, which is a rotation angle of the first motor 41m. An angle of the joint 42 is represented by rotation angle θ2, which is a rotation angle of the second motor 42m. An angle of the joint 43 is represented by rotation angle θ3, which is a rotation angle of the third motor 43m. An angle of the joint 44 is represented by rotation angle θ4, which is a rotation angle of the fourth motor 44m. An angle of the joint 45 is represented by rotation angle θ5, which is a rotation angle of the fifth motor 45m. An angle of the joint 46 is represented by rotation angle θ6, which is a rotation angle of the sixth motor 46m.

Figure 2:
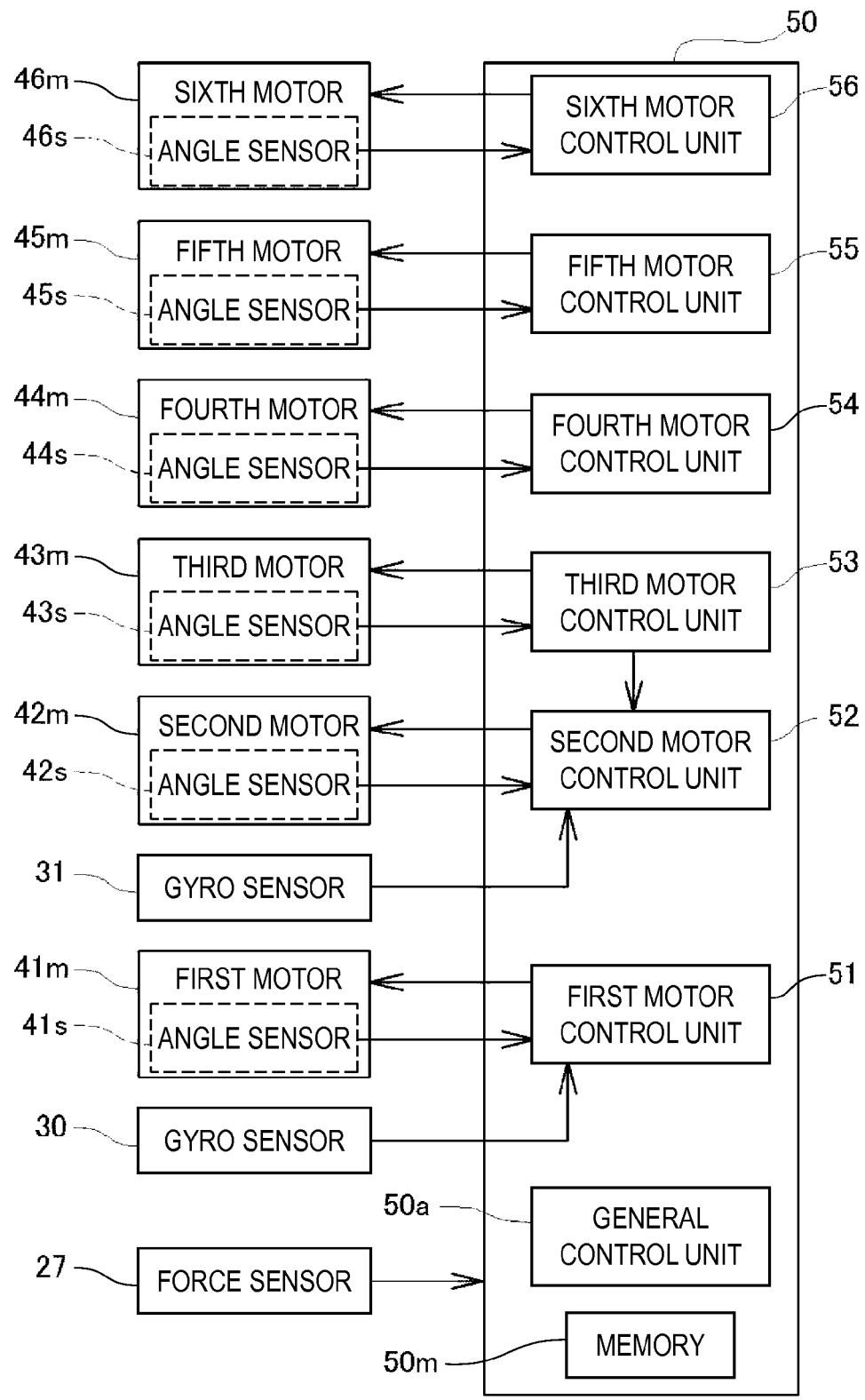
FIG. 2 is a block diagram showing the internal configuration of a control unit.

FIG. 2 is a block diagram showing the internal configuration of the control unit 50. As shown in the figure, the control unit 50 is mounted with, for example, a first motor control unit 51 for controlling the first motor 41m, a second motor control unit 52 for controlling the second motor 42m, a third motor control unit 53 for controlling the third motor 43m, a fourth motor control unit 54 for controlling the fourth motor 44m, a fifth motor control unit 55 for controlling the fifth motor 45m, a sixth motor control unit 56 for controlling the sixth motor 46m, a general control unit 50a for controlling the operation of the entire robot 1, and a memory 50m having stored therein a computer program and the like executed by the general control unit 50a.

The first motor 41m is mounted with an angle sensor 41s that detects the rotation angle θ1 of the first motor 41m. Similarly, the second motor 42m is mounted with an angle sensor 42s that detects the rotation angle θ2 of the second motor 42m. The third motor 43m is mounted with an angle sensor 43s that detects the rotation angle θ3 of the third motor 43m. The fourth motor 44m is mounted with an angle sensor 44s that detects the rotation angle θ4 of the fourth motor 44m. The fifth motor 45m is mounted with an angle sensor 45s that detects the rotation angle θ5 of the fifth motor 45m. The sixth motor 46m is mounted with an angle sensor 46s that detects the rotation angle θ6 of the sixth motor 46m.

The respective motor control units (the first motor control unit 51 to the sixth motor control unit 56) control the operations of the respective motors (the first motor 41m to the sixth motor 46m) on the basis of outputs from the angle sensors 41s to 46s mounted on the motors (the first motor 41m to the sixth motor 46m) set as control targets.

For example, the sixth motor control unit 56 controls the operation of the sixth motor 46m on the basis of the rotation angle θ6 detected by the angle sensor 46s. Similarly, the third motor control unit 53 to the fifth motor control unit 55 control the operations of the third motor 43m to the fifth motor 45m on the basis of the rotation angles θ3 to θ5 detected by the angle sensors 43s to 45s.

However, the second motor control unit 52 controls the operation of the second motor 42m using not only the rotation angle θ2 detected by the angle sensor 42s but also an output of the gyro sensor 31 and information from the third motor control unit 53. Details of the control performed by the second motor control unit 52 are explained below.

The first motor control unit 51 controls the operation of the first motor 41m using not only the rotation angle θ1 detected by the angle sensor 41s but also an output of the gyro sensor 30. Details of the control performed by the first motor control unit 51 are explained below.

An output of the force sensor 27 is also supplied to the control unit 50. The control unit 50 samples the outputs of the angle sensors 41s to 46s, the gyro sensors 30 and 31, and the force sensor 27 at a cycle equal to or higher than 100 Hz.

Figure 3A:
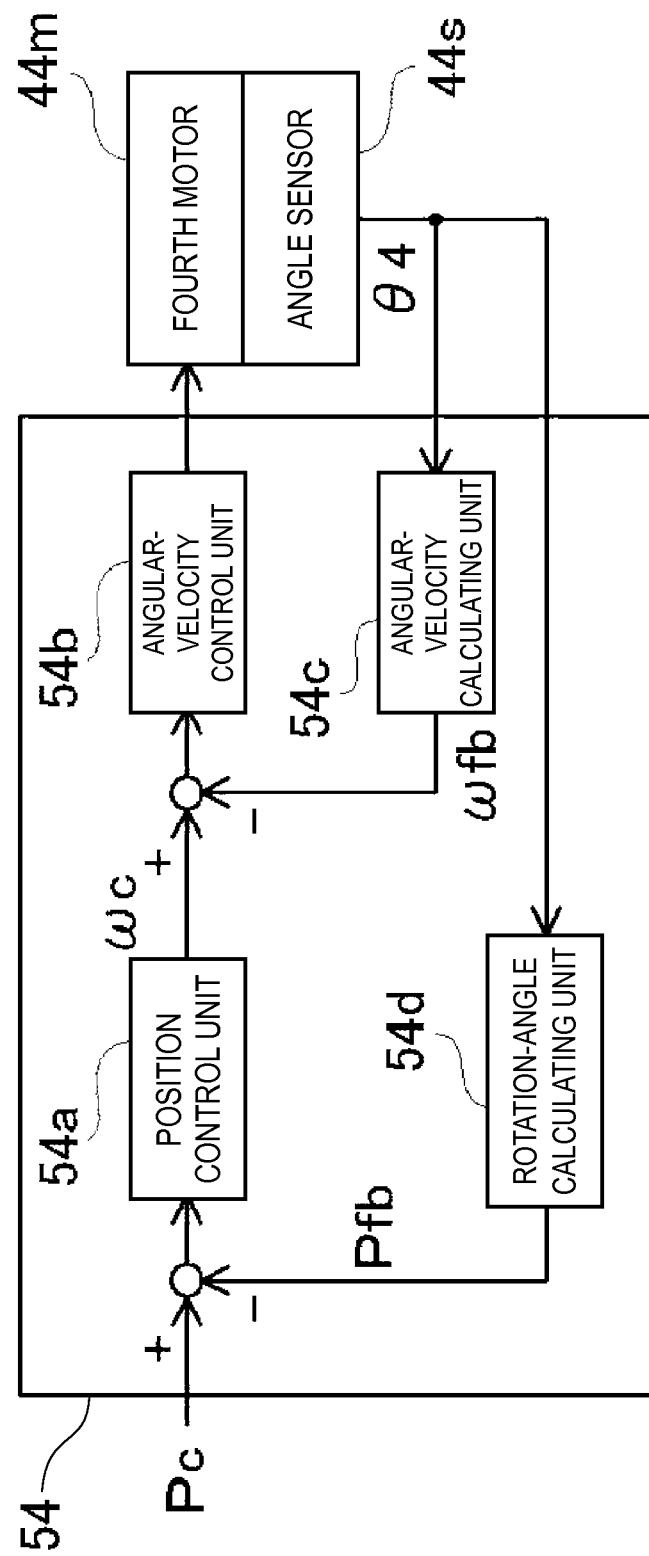
FIGS. 3A to 3C are block diagrams showing the operation of the control unit according to the first embodiment.
Figure 3B:
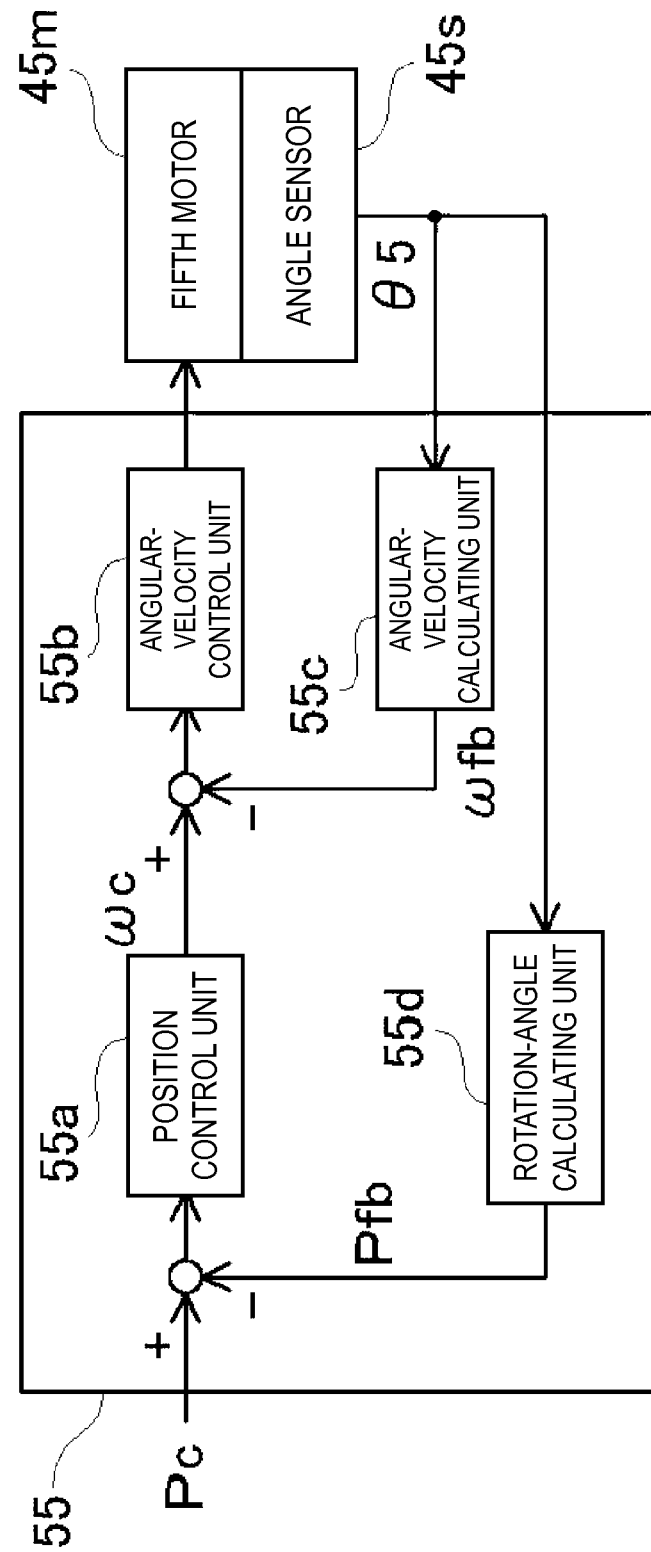
Figure 3C:
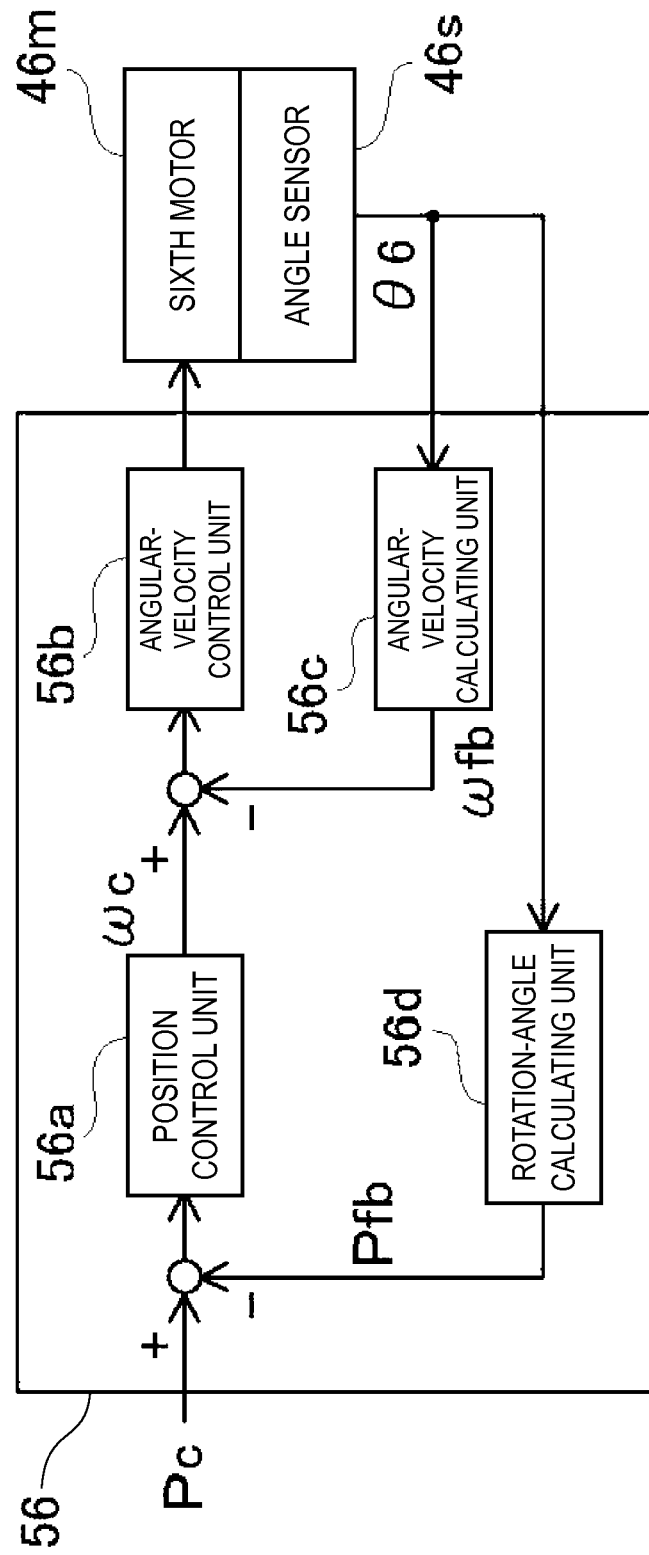

FIGS. 3A to 3C are block diagrams showing the operation of the control unit 50 according to the first embodiment. In FIG. 3A, the operation of the fourth motor control unit 54 for controlling the fourth motor 44m is shown as the block diagram. In FIG. 3B, the operation of the fifth motor control unit 55 for controlling the fifth motor 45m is shown as the block diagram. In FIG. 3C, the operation of the sixth motor control unit 56 for controlling the sixth motor 46m is shown as the block diagram.

As shown in the figures, the fourth motor control unit 54, the fifth motor control unit 55, and the sixth motor control unit 56 are completely the same in control contents except that control targets are the fourth motor 44m, the fifth motor 45m, and the sixth motor 46m. Therefore, control by the fourth motor control unit 54 shown in FIG. 3A is explained as an example.

As shown in FIG. 3A, the fourth motor control unit 54 receives a target position Pc from the general control unit 50a and performs control to set the rotation angle θ4 of the angle sensor 44s to the target position Pc. Therefore, the fourth motor control unit 54 basically has a control structure including a large loop for feedback-controlling position information from the rotation angle θ4 detected by the angle sensor 44s and a small loop for feedback-controlling angular velocity from the rotation angle θ4.

The target position Pc received from the general control unit 50a is input to a position control unit 54a. In this case, the rotation angle θ4 detected by the angle sensor 44s is, after being converted into a position feedback value Pfb by a rotation-angle calculating unit 54d, subtracted from the target position Pc and input to the position control unit 54a.

The position control unit 54a generates target angular velocity ωc corresponding to a deviation between the target position Pc and the position feedback value Pfb and inputs the target angular velocity ωc to an angular-velocity control unit 54b. In this case, the rotation angle θ4 detected by the angle sensor 44s is, after being converted into an angular velocity feedback value ωfb by an angular-velocity calculating unit 54c, subtracted from the target angular velocity ωc and input to the angular-velocity control unit 54b.

The angular-velocity control unit 54b controls the fourth motor 44m according to a deviation between the target angular velocity ωc and the angular velocity feedback value ωfb. A result of the control is reflected on the rotation angle θ4 detected by the angle sensor 44s and position feedback control is performed via the rotation-angle calculating unit 54d (the large loop). Angular velocity feedback control is performed via the angular-velocity calculating unit 54c (the small loop).

Figure 4:
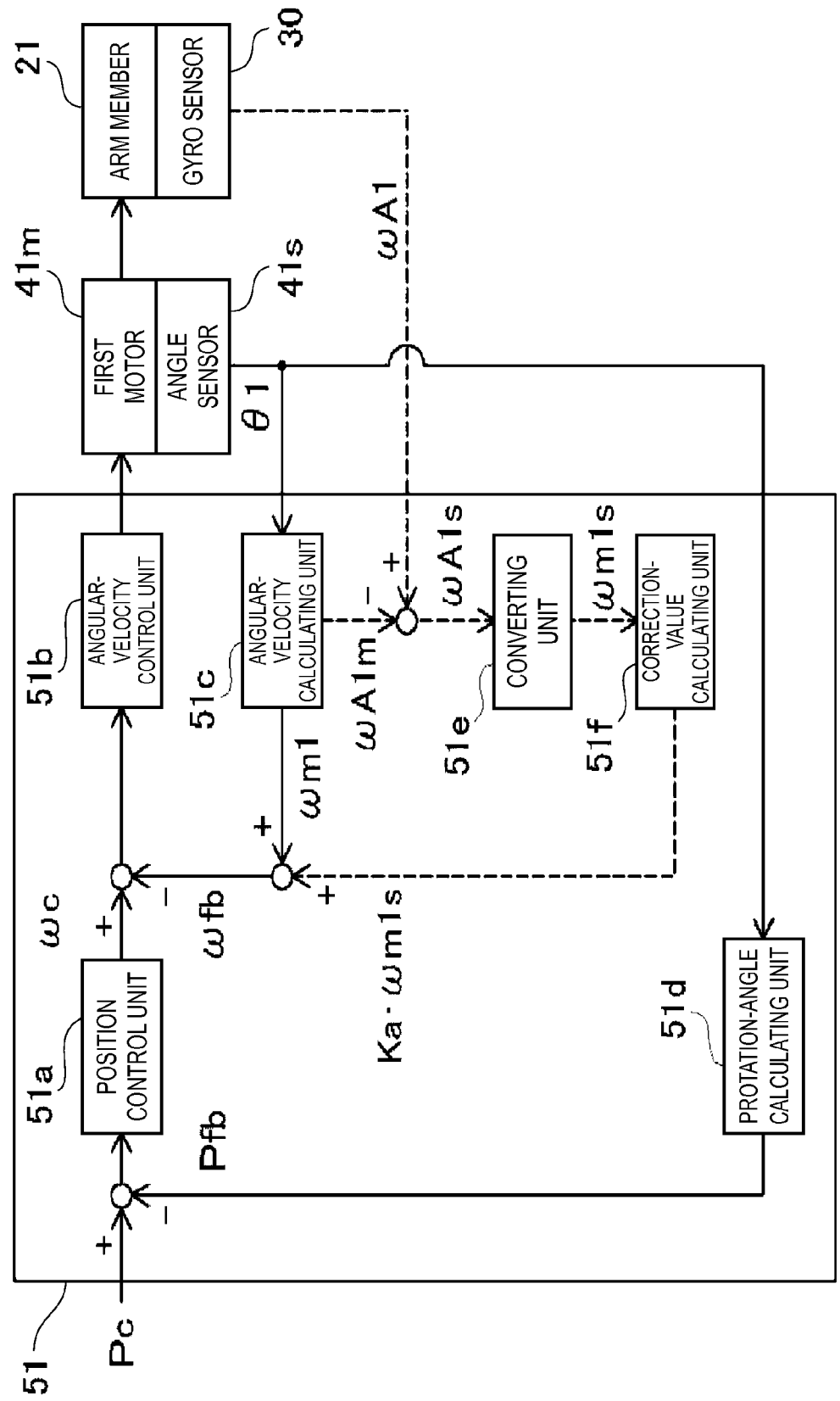
FIG. 4 is a block diagram showing the operation of a first motor control unit.

FIG. 4 is a block diagram showing the operation of the first motor control unit 51 for controlling the first motor 41m.

The first motor control unit 51 also controls the first motor 41m using the rotation angle θ1 detected by the angle sensor 41s. In this regard, the control is the same as the control performed by the fourth motor control unit 54, the fifth motor control unit 55, and the sixth motor control unit 56. However, the first motor control unit 51 controls the operation of the first motor 41$m$ using the output from the gyro sensor 30 as well.

Consequently, the control performed by the first motor control unit 51 is a combination of the position feedback control and the angular velocity feedback control performed using the rotation angle $\theta 1$ detected by the angle sensor 41$s$ and the angular velocity feedback control performed using the output of the gyro sensor 30.

In FIG. 4, the position feedback control and the angular velocity feedback control performed using the rotation angle $\theta 1$ are represented by solid line arrows. The angular velocity feedback control performed using the output of the gyro sensor 30 is represented by broken line arrows. The operation of the first motor control unit 51 for controlling the first motor 41$m$ is explained below with reference to FIG. 4.

Like the fourth motor control unit 54, the first motor control unit 51 receives the target position Pc from the general control unit 50$a$ and performs control for setting the rotation angle $\theta 1$ of the angle sensor 41$s$ to the target position Pc. That is, the target position Pc received from the general control unit 50$a$ is input to a position control unit 51$a$. In this case, the rotation angle $\theta 1$ detected by the angle sensor 41$s$ is, after being converted into the position feedback value Pfb by a rotation-angle calculating unit 51$d$, subtracted from the target position Pc and input to the position control unit 51$a$.

The position control unit 51$a$ generates the target angular velocity $\omega c$ corresponding to a deviation between the target position Pc and the position feedback value Pfb and inputs the target angular velocity $\omega c$ to an angular-velocity control unit 51$b$. In this case, the angular velocity feedback value $\omega fb$ generated on the basis of the output from the angle sensor 41$s$ and the output from the gyro sensor 30 is subtracted from the target angular velocity $\omega c$ and input to the angular-velocity control unit 51$b$. A method of generating the angular velocity feedback value $\omega fb$ on the basis of the output from the angle sensor 41$s$ and the output from the gyro sensor 30 is explained below.

The angular-velocity control unit 51$b$ controls the first motor 41$m$ according to the deviation between the target angular velocity $\omega c$ and the angular velocity feedback value $\omega fb$. As a result, the rotation angle $\theta 1$ detected by the angle sensor 41$s$ changes. As a result of rotating the arm member 21 with the first motor 41$m$, angular velocity $\omega A1$ is output from the gyro sensor 30. The rotation angle $\theta 1$ detected by the angle sensor 41$s$ is converted into the position feedback value Pfb by the rotation-angle calculating unit 51$d$.

The position feedback control is performed by feeding back the position feedback value Pfb obtained in this way to the target position Pc.

On the other hand, the angular velocity feedback value $\omega fb$ is generated as explained below. First, the rotation angle $\theta 1$ detected by the angle sensor 41$s$ is supplied to an angular-velocity calculating unit 51$c$. The angular-velocity calculating unit 51$c$ generates angular velocity $\omega m1$ of the first motor 41$m$ and angular velocity $\omega A1m$ of the arm member 21 from the rotation angle $\theta 1$. The angular velocity $\omega A1m$ of the arm member 21 is a value obtained by dividing the angular velocity $\omega m1$ of the first motor 41$m$ by a reduction ratio of the joint 41 between the first motor 41$m$ and the arm member 21.

The angular velocity $\omega A1m$ of the arm member 21 should originally coincide with the angular velocity $\omega A1$ obtained from the gyro sensor 30. Therefore, a deviation between the angular velocity $\omega A1m$ and the angular velocity $\omega A1$ represents an oscillation component of the arm member 21 centering on the rotation axis of the joint 41.

Therefore, oscillation acceleration $\omega A1s$ equivalent to the oscillation component is generated by subtracting the angular velocity $\omega A1m$ of the arm member 21 from the angular velocity $\omega A1$ obtained from the gyro sensor 30. Thereafter, the oscillation acceleration $\omega A1s$ of the arm member 21 is converted into oscillation acceleration $\omega m1s$ of the first motor 41$m$ by multiplying the oscillation acceleration $\omega A1s$ with the reduction ratio of the joint 41 in a converting unit 51$e$. The oscillation acceleration $\omega m1s$ is supplied to a correction-value calculating unit 51$f$ and multiplied with a gain coefficient Ka, whereby a correction value Ka·$\omega m1s$ is calculated.

The correction value Ka·$\omega m1s$ and the angular velocity $\omega m1$ calculated by the angular-velocity calculating unit 51$c$ are added up, whereby the angular velocity feedback value $\omega fb$ is calculated. The first motor control unit 51 performs angular velocity feedback control using the angular velocity feedback value $\omega fb$ calculated from the outputs of the angle sensor 41$s$ and the gyro sensor 30.

Note that, in order to suppress oscillation of the arm 20 during the operation of the robot 1, it is important to appropriately set the gain coefficient Ka. The robot 1 according to the first embodiment also has a characteristic in setting of the gain coefficient Ka. This point is explained below in detail.

Figure 5:
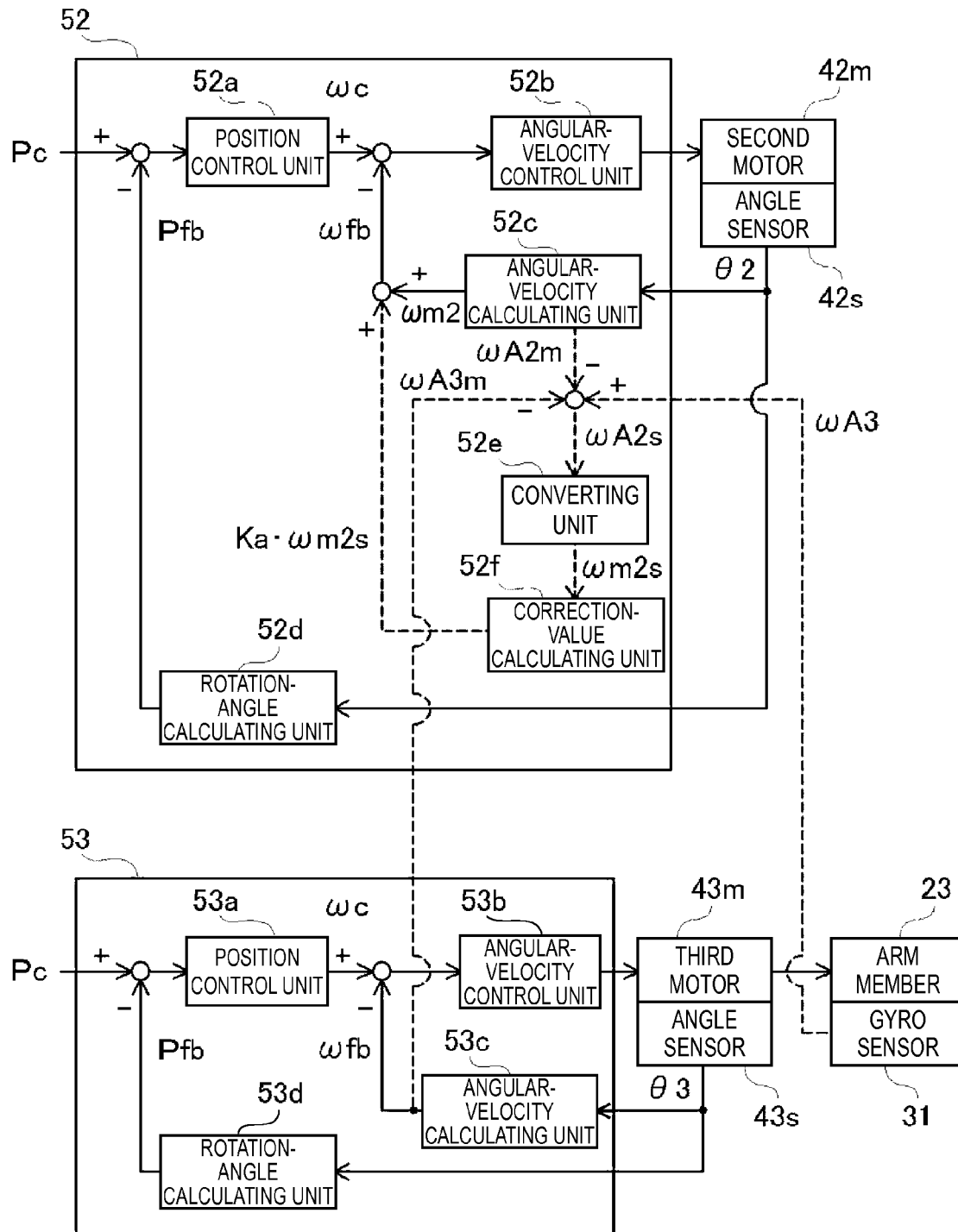
FIG. 5 is a block diagram showing the operations of a second motor control unit and a third motor control unit.

FIG. 5 is a block diagram showing the operation of the second motor control unit 52 for controlling the second motor 42$m$ and the operation of the third motor control unit 53 for controlling the third motor 43$m$.

In FIG. 5, the control of the second motor control unit 52 and the control of the third motor control unit 53 are collectively shown because, as shown in FIG. 2, the second motor control unit 52 uses the information from the third motor control unit 53 when the second motor control unit 52 controls the second motor 42$m$. This is also because the gyro sensor 31, an output of which is used by the second motor control unit 52 when the second motor control unit 52 controls the second motor 42$m$, is mounted on the arm member 23 driven by the third motor 43$m$.

However, when focusing on only the third motor control unit 53, the control performed by the third motor control unit 53 is the same as the control performed by the fourth motor control unit 54, the fifth motor control unit 55, and the sixth motor control unit 56.

The control performed by the third motor control unit 53 is briefly explained below.

As shown in FIG. 5, the third motor control unit 53 receives the target position Pc from the general control unit 50$a$ shown in FIG. 2. Thereafter, the target position Pc is input to a position control unit 53$a$. In this case, the rotation angle $\theta 3$ detected by the angle sensor 43$s$ is, after being converted into the position feedback value Pfb by a rotation-angle calculating unit 53$d$, subtracted from the target position Pc and input to the position control unit 53$a$.

The position control unit 53$a$ generates the target angular velocity $\omega c$ corresponding to a deviation between the target position Pc and the position feedback value Pfb and inputs the target angular velocity $\omega c$ to an angular-velocity control unit 53$b$. In this case, the rotation angle $\theta 3$ detected by the angle sensor 43$s$ is, after being converted into the angular velocity feedback value $\omega fb$ by an angular-velocity calculating unit 53$c$, subtracted from the target angular velocity $\omega c$ and input to the angular-velocity control unit 53$b$.

The angular-velocity control unit 53$b$ controls the third motor 43$m$ according to a deviation between the target angular velocity ωc and the angular velocity feedback value ωfb. A result of the control is reflected on the rotation angle θ3 detected by the angle sensor 43s. Position feedback control is performed via the rotation-angle calculating unit 53d. Angular velocity feedback control is performed via the angular-velocity calculating unit 53c.

The third motor 43m is driven by the third motor control unit 53, whereby the arm member 23 is rotated. Then, angular velocity ωA3 is output from the gyro sensor 31 mounted on the arm member 23. The second motor control unit 52 receives the angular velocity ωA3 output from the gyro sensor 31 and uses the angular velocity ωA3 for the angular velocity feedback control. A basic method of using the angular velocity ωA3 output from the gyro sensor 31 for the angular velocity feedback control is the same as the method in which the first motor control unit 51 uses the angular velocity ωA1 output from the gyro sensor 30.

The angular-velocity calculating unit 53c of the third motor control unit 53 calculates angular velocity ωA3m from the rotation angle θ3. The second motor control unit 52 also uses the angular velocity ωA3m obtained by the angular-velocity calculating unit 53c of the third moor control unit 53 for the angular velocity feedback control. In FIG. 5, a portion where the second motor control unit 52 performs the angular velocity feedback control using the angular velocity ωA3 output from the gyro sensor 31 and the angular velocity ωA3m obtained by the angular-velocity calculating unit 53c of the third motor control unit 53 is represented by a broken line arrow.

The second motor control unit 52 also receives the target position Pc received from the general control unit 50a. Thereafter, the target position Pc is input to the position control unit 52a. In this case, the rotation angle θ2 detected by the angle sensor 42s is, after being converted into the position feedback value Pfb by a rotation-angle calculating unit 52d, subtracted from the target position Pc and input to the position control unit 52a.

The position control unit 52a generates the target angular velocity ωc corresponding to a deviation between the target position Pc and the position feedback value Pfb and inputs the target angular velocity ωc to an angular-velocity control unit 52b. In this case, the angular velocity feedback value ωfb generated using the rotation angle θ2 detected by the angle sensor 42s, the angular velocity ωA3 output from the gyro sensor 31, and the angular velocity ωA3m obtained by the angular-velocity calculating unit 53c of the third motor control unit 53 is subtracted from the target angular velocity ωc and input to the angular-velocity control unit 52b.

A method of generating the angular velocity feedback value ωfb on the basis of the rotation angle θ2 detected by the angle sensor 42s, the angular velocity ωA3 output from the gyro sensor 31, and the angular velocity ωA3m obtained by the angular-velocity calculating unit 53c of the third motor control unit 53 is explained below.

The angular-velocity control unit 52b controls the second motor 42m according to a deviation between the target angular velocity ωc and the angular velocity feedback value ωfb. As a result, the rotation angle θ2 detected by the angle sensor 42s is converted into the position feedback value Pfb by the rotation-angle calculating unit 52d. The position feedback value Pfb obtained in this way is fed back to the target position Pc, whereby the position feedback control is performed.

The second motor 42m is driven, whereby the arm member 22 rotates. As a result, the angular velocity ωA3 is output from the gyro sensor 31. The angular velocity ωA3 is used for the angular velocity feedback control of the second motor 42m via the angular velocity feedback value ωfb of the second motor control unit 52.

The angular velocity feedback value ωfb of the second motor control unit 52 is generated as explained below. First, the rotation angle θ2 detected by the angle sensor 42s is supplied to an angular-velocity calculating unit 52c. The angular-velocity calculating unit 52c generates angular velocity ωm2 of the second motor 42m and angular velocity ωA2m of the arm member 22 based on the rotation angle θ2. The angular velocity ωA2m of the arm member 22 can be calculated by dividing the angular velocity ωm2 of the second motor 42m by a reduction ratio of the joint 42 between the second motor 42m and the arm member 22.

If the third motor 43m is fixed, the arm member 22 and the arm member 23 may be considered to be integral. Therefore, the angular velocity ωA2m of the arm member 22 should originally coincide with the angular velocity ωA3 obtained from the gyro sensor 31. Therefore, a deviation between the angular velocity ωA2m and the angular velocity ωA3 represents an oscillation component of the arm member 22 obtained when it is assumed that the third motor 43m is fixed. However, actually, since the third motor 43m is not fixed, the joint rotates. Therefore, oscillation acceleration ωA2s equivalent to an oscillation component in the joint 42 can be calculated by subtracting the angular velocity ωA2m of the arm member 22 and the angular velocity ωA3m of the arm member 23 from the angular velocity ωA3 obtained from the gyro sensor 31.

Thereafter, the oscillation acceleration ωA2s of the arm member 22 obtained in this way is converted into oscillation acceleration ωm2s of the second motor 42m by multiplying the oscillation acceleration ωA2s with the reduction ratio of the joint 42 by a converting unit 52e. A correction value Ka·ωm2s is calculated by multiplying the oscillation acceleration ωm2s with the gain coefficient Ka by a correction-value calculating unit 52f. The gain coefficient Ka can also be set to a value different from the gain coefficient Ka used in the correction-value calculating unit 51f of the first motor control unit 51.

An angular velocity feedback value ωfb is calculated by adding up the correction value Ka·ωm2s calculated in this way and the angular velocity ωm2 calculated by the angular-velocity calculating unit 52c. The second motor control unit 52 performs the angular velocity feedback control in this way. Note that, in the second motor control unit 52, as in the first motor control unit 51, it is important to appropriately set the gain coefficient Ka in order to suppress oscillation of the arm 20.

The gain coefficient Ka of the second motor control unit 52 is set on the basis of the rotation angle θ3 of the arm member 23 with respect to the arm member 22. The gain coefficient Ka of the first motor control unit 51 is set on the basis of the rotation angle θ2 of the arm member 22 with respect to the arm member 21. Note that the gain coefficient Ka of the first motor control unit 51 is substantially the same as the gain coefficient Ka of the second motor control unit 52. Therefore, first, the gain coefficient Ka of the second motor control unit 52 is explained.

Figure 6:
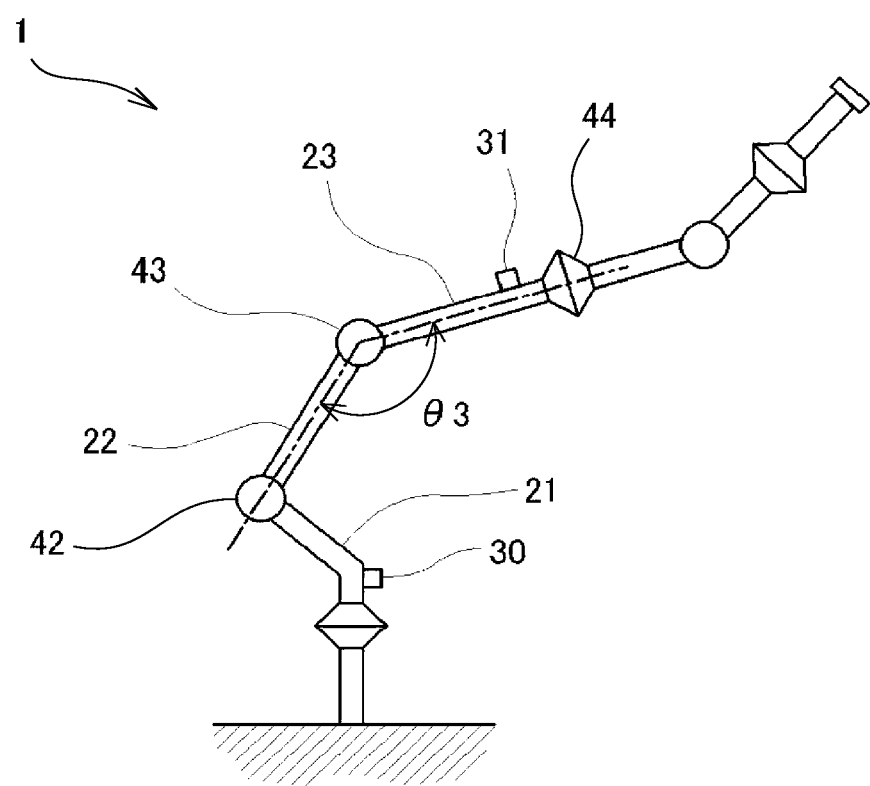
FIG. 6 is an explanatory diagram showing a rotation angle in setting a gain coefficient of the second motor control unit.

FIG. 6 is an explanatory diagram showing the rotation angle θ3 in setting the gain coefficient Ka of the second motor control unit 52. That is, considering a straight line connecting substantially center positions of the joint 42 and the joint 43 present on both end sides of the arm member 22 and a straight line connecting substantially center positions of the joint 43 and the joint 44 present on both end sides of the arm member 23, an angle formed by the straight lines is used as the rotation angle θ3. As the rotation angle θ3 is closer to 180°, the arm member 22 and the arm member 23 are more stretched. As the rotation angle θ3 is closer to 0°, the arm member 22 and the arm member 23 are more folded. In this embodiment, as the rotation angle θ3 is closer to 180°, the gain coefficient Ka of the second motor control unit 52 is set to a larger value. As the rotation angle θ3 is closer to 0°, the gain coefficient Ka of the second motor control unit 52 is set to a smaller value. A reason for this as explained below.

In a state in which the arm member 22 and the arm member 23 are stretched in a linear shape (a state in which the rotation angle θ3 is closer to 180°), since an inertial moment around the rotation axis of the joint 42 increases, large oscillation occurs according to a motion. As a result, in order to increase an oscillation suppression effect, the second motor 42*m* needs to generate large torque. It is desirable to increase the gain coefficient Ka of the second motor control unit 52. In the state in which the arm member 22 and the arm member 23 are stretched, the control of the arm 20 less easily becomes unstable. Therefore, by setting the gain coefficient Ka of the second motor control unit 52 to a large value, it is possible to quickly suppress the oscillation of the arm 20.

In a state in which the arm member 22 and the arm member 23 are folded (a state in which the rotation angle θ3 is close to 0° or 360°), since the inertial moment around the rotation axis of the joint 42 is small, it is unnecessary to generate very large torque. Therefore, oscillation can be suppressed even if the gain coefficient Ka of the second motor control unit 52 is not set large. In the state in which the arm member 22 and the arm member 23 are folded, the control of the arm 20 easily becomes unstable and oscillation easily occurs. Therefore, it is desirable to set the gain coefficient Ka of the second motor control unit 52 small because it is possible to prevent the control of the arm 20 from oscillating and stabilize the control.

Figure 7:
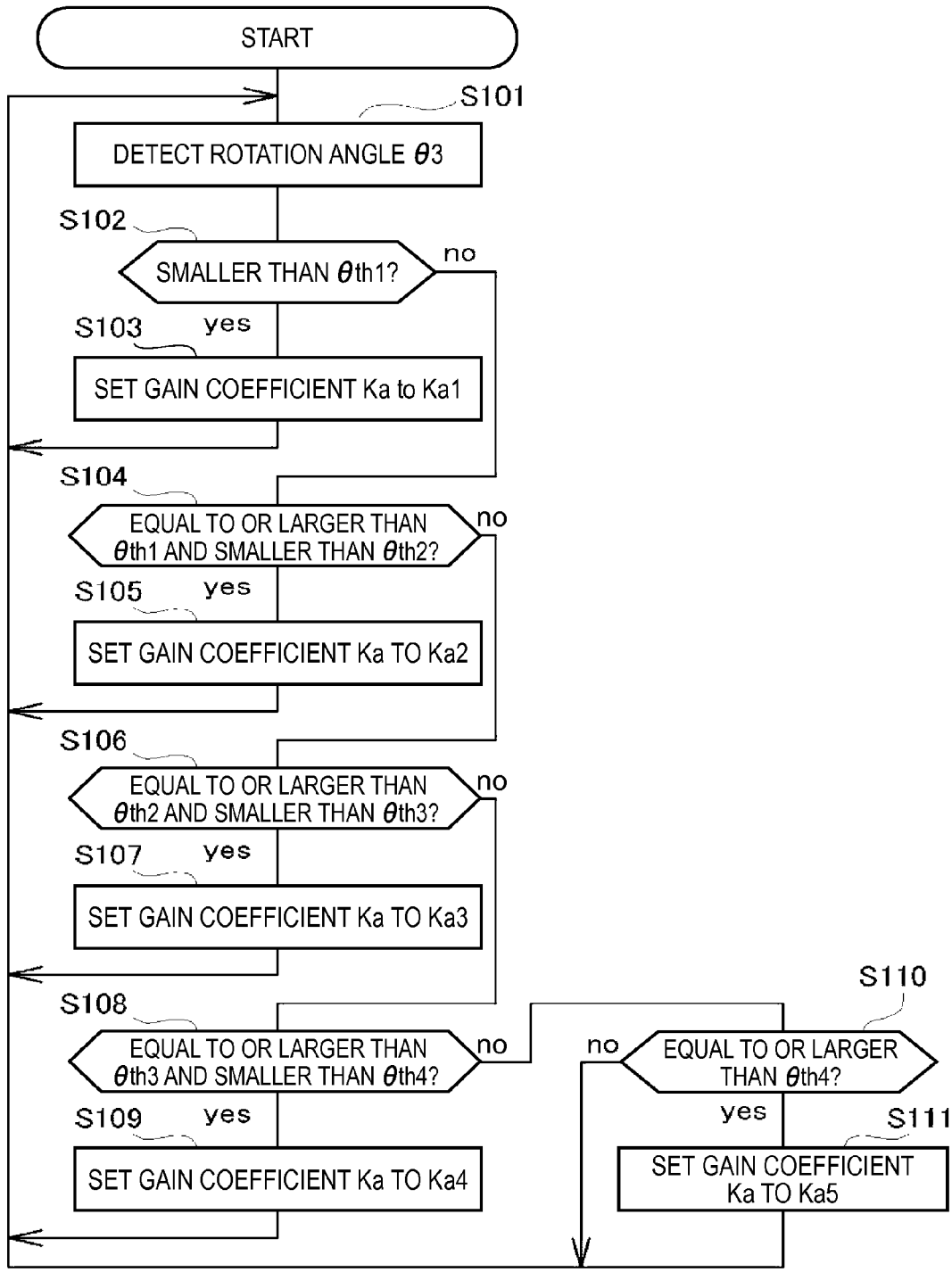
FIG. 7 is a flowchart of processing for setting the gain coefficient of the second motor control unit.

FIG. 7 is a flowchart of processing for setting the gain coefficient Ka of the second motor control unit 52. When the gain coefficient Ka of the second motor control unit 52 is set, first, the rotation angle θ3 is detected on the basis of an output of the angle sensor 43*s* (step S101). As explained above with reference to FIG. 6, the rotation angle θ3 is an angle formed by the arm member 22 and the arm member 23.

Subsequently, it is determined whether the detected rotation angle θ3 is smaller than a first threshold angle θth1 (step S102). The first threshold angle θth1 is set to an appropriate angle (representatively, 90°) selected from a range of 0° to 110° (more preferably, a range of 45° to 90°).

As a result, when the rotation angle θ3 is smaller than the first threshold angle θth1 (yes in step S102), the gain coefficient Ka of the second motor control unit 52 is set to a gain Ka1 (step S103). Ka1 is set to an appropriate value selected from a range of 0 to 0.3 (more preferably, a range of 0 to 0.2).

On the other hand, when the rotation angle θ3 is not smaller than the first threshold angle θth1 (no in step S102), it is determined whether the rotation angle θ3 is equal to or larger than the first threshold angle θth1 and smaller than a second threshold angle θth2 (step S104). The second threshold angle θth2 is set to an appropriate angle (representatively, 135°) selected from a range of 60° to 150° (more preferably, a range of 80° to 140°).

As a result, when the rotation angle θ3 is equal to or larger than the first threshold angle θth1 and smaller than the second threshold angle θth2 (yes in step S104), the gain coefficient Ka of the second motor control unit 52 is set to Ka2 (step S105). Ka2 is set to an appropriate value selected from a range of 0 to 0.5 (more preferably, a range of 0.1 to 0.4).

When the rotation angle θ3 is not equal to or larger than the first threshold angle θth1 and smaller than the second threshold angle θth2 (no in step S104), it is determined whether the rotation angle θ3 is equal to or larger than the second threshold angle θth2 and smaller than a third threshold angle θth3 (step S106). The third threshold angle θth3 is set to an appropriate angle (representatively, 225°) selected from a range of 210° to 300° (more preferably, a range of 220° to 280°).

As a result, when the rotation angle θ3 is equal to or larger than the second threshold angle θth2 and smaller than the third threshold angle θth3 (yes in step S106), the gain coefficient Ka of the second motor control unit 52 is set to Ka3 (step S107). Ka3 is set to an appropriate value selected from a range of 0.1 to 0.8 (more preferably, a range of 0.2 to 0.5).

When the rotation angle θ3 is not equal to or larger than the second threshold angle θth2 and smaller than the third threshold angle θth3 (no in step S106), it is determined whether the rotation angle θ3 is equal to or larger than the third threshold angle θth3 and smaller than a fourth threshold angle θth4 (step S108). The fourth threshold angle θth4 is set to an appropriate angle (representatively, 270°) selected from a range of 250° to 360° (more preferably, a range of 270° to 315°).

As a result, when the rotation angle θ3 is equal to or larger than the third threshold angle θth3 and smaller than the fourth threshold angle θth4 (yes in step S108), the gain coefficient Ka of the second motor control unit 52 is set to Ka4 (step S109). Ka4 is set to an appropriate value selected from a range of 0 to 0.5 (more preferably, a range of 0.1 to 0.4).

On the other hand, when the rotation angle θ3 is not equal to or larger than the third threshold angle θth3 and smaller than the fourth threshold angle θth4 (no in step S108), the gain coefficient Ka of the second motor control unit 52 is set to Ka5 (step S110). Ka5 is set to an appropriate value selected from a range of 0 to 0.3 (more preferably, a range of 0 to 0.2). Note that Ka1, Ka2, Ka3, Ka4, and Ka5 set as the gain coefficient Ka of the second motor control unit 52 are set to be Ka1<Ka2<Ka3>Ka4>Ka5. The same value can be used as Ka1 and Ka5 or different values can be used as Ka1 and Ka5. Similarly, the same value can be used as Ka2 and Ka4 or different values can be used as Ka2 and Ka4.

Note that, in the explanation in this embodiment, the rotation angle θ3 of the arm member 23 with respect to the arm member 22 is divided into the five ranges. The gain coefficient Ka of the second motor control unit 52 is appropriately set concerning each of the ranges. However, the rotation angle θ3 is not always divided into the five ranges and may be divided into, for example, two, three, four, or six or more ranges. The gain coefficient Ka of the second motor control unit 52 may be continuously changed according to the rotation angle θ3 rather than being changed stepwise.

The processing for setting the gain coefficient Ka of the second motor control unit 52 according to the rotation angle θ3 of the arm member 23 with respect to the arm member 22 is explained above. The gain coefficient Ka of the first motor control unit 51 can be set in substantially the same manner. That is, the rotation angle θ2 of the arm member 22 with respect to the arm member 21 is detected (equivalent to step S101 in FIG. 7), the rotation angle θ2 is compared with a threshold angle set in advance (equivalent to steps S102, S104, S106, S108, and S110 in FIG. 7), and a value of the gain coefficient Ka of the first motor control unit 51 is set according to a size relation of the angles (equivalent to steps S103, S105, S107, S109, and S111). The number of thresholds to be compared is not limited to four and may be smaller than four or may be larger than four.

Consequently, it is possible to appropriately set the gain coefficient Ka of the second motor control unit 52 according to the rotation angle θ3 and appropriately set the gain coefficient Ka of the first motor control unit 51 according to the rotation angle θ2. Therefore, it is possible to quickly attenuate the oscillation of the arm 20. Note that, in the following explanation, the gain coefficient Ka of the second motor control unit 52 and the gain coefficient Ka of the first motor control unit 51 are sometimes collectively simply referred to as gain coefficient Ka.

When the oscillation acceleration ωA2s is in the opposite phase, by setting the gain coefficient Ka to a negative value, it is possible to more quickly suppress the oscillation and stabilize the control. In this case, Ka1, Ka2, Ka3, Ka4, and Kay of the gain coefficient Ka of the second motor control unit 52 are set to values explained below.

First, Ka1 is set to an appropriate value selected from a range of −0.2 to 0.3 (more preferably, a range of −0.1 to 0.1). Ka2 is set to a value selected from a range of 0.1 to 0.4 (more preferably, a range of 0.1 to 0.3). Ka3 is set to an appropriate value selected from a range of 0.3 to 0.7 (more preferably, a range of 0.3 to 0.6). Ka4 is set to an appropriate value selected from a range of 0.1 to 0.4 (more preferably, a range of 0.1 to 0.3). Ka5 is set to an appropriate value selected from a range of −0.2 to 0.3 (more preferably, a range of −0.1 to 0.1). By selecting and setting Ka1, Ka2, Ka3, Ka4, and Ka5 from such ranges, it is possible to suppress the oscillation of the arm 20 and realize stabilization of the control.

In the robot 1 according to the first embodiment explained above, it is possible to easily and surely suppress the oscillation of the arm 20. An enormous arithmetic operation for, for example, solving Inverse Jacobian from the distal end side of the arm 20 is unnecessary. Therefore, it is possible to increase response speed in the control of the robot 1 and simplify the configuration of the control unit 50. Since an arithmetic operation including a singular point in solving the Inverse Jacobian is absent, an arithmetic operation is simplified. Further, since a condition for enabling control is absent, it is possible to surely execute the control of the robot 1.

In addition, the robot 1 according to the first embodiment also uses, for the control of the second motor 42m that drives the arm member 22, an output of the gyro sensor 31 attached to the arm member 23. Since the arm member 23 is present further on the distal end side than the arm member 22, the oscillation of the arm member 22 is included in the output of the gyro sensor 31 in addition to the oscillation of the arm member 23. Therefore, if the output of the gyro sensor 31 is used for the control of the second motor 42m, it is possible to control both of the oscillations of the arm member 23 and the arm member 22 and improve an oscillation suppression effect.

Since the joint on the base 10 side having larger oscillation can be controlled, it is possible to more effectively suppress the oscillation of the arm member 22.

Oscillations of the arm member 23 and the arm member 22 including the joint 42 and the joint 43, the directions of the rotation axes of which coincide with each other, in other words, the directions of the rotation axes of which are the same, can be suppressed by one gyro sensor 31. Therefore, it is possible to suppress the oscillation of the arm using angular velocity sensors (gyro sensors) fewer than the number of joints.

The gyro sensor 30 is attached to the arm member 21. The gyro sensor 31 is attached to the arm member 23 connected to the arm member 21 via the joint 42, the arm member 22, and the joint 43. The rotation axis of the joint 41 that rotates the arm member 21 and the rotation axes of the joint 42 and the joint 43 are orthogonal to each other. Therefore, it is possible to detect, as simple rotation components not mixed with each other, the angular velocity of the arm member 21 to which the gyro sensor 30 is attached and the angular velocity of the arm member 23 to which the gyro sensor 31 is attached.

As a result, it is possible to more easily, accurately, and surely suppress the oscillation of the arm 20. Further, since the angular velocity of the arm member 21 and the angular velocity of the arm member 23 can be detected as simple rotation components not mixed with each other, it is possible to more surely suppress the oscillation of the arm 20 by performing feedback control for each of the components.

In addition, by setting the gain coefficient Ka according to the rotation angle θ3 of the arm member 23 with respect to the arm member 22, it is possible to surely suppress the oscillation of the arm 20 while stabilizing the control.

Like the robot in the past, when a load applied to an end effector or a robot hand attached to the distal end of the arm is detected using a force sensor, because detection sensitivity of the load is improved, the rigidity of the portion of the force sensor decreases and the rigidity of the entire arm decreases. When the rigidity of the entire arm decreases, since various orders of resonance easily occur, it is difficult to suppress the oscillation of the arm. Therefore, there are two alternatives: instead of keeping the detection sensitivity of the load low, the oscillation of the arm is suppressed as quickly as possible by keeping the rigidity of the entire arm high or, instead of giving up suppressing the oscillation of the arm as quickly as possible, the load is detected at high sensitivity to make it possible to grip, for example, a fragile workpiece.

However, in the robot 1 according to the first embodiment, even if the rigidity of the entire arm 20 decreases, it is possible to quickly suppress the oscillation of the arm 20 by feedback-controlling the outputs of the gyro sensors 30 and 31. Therefore, it is possible to quickly suppress the oscillation of the arm 20 and realize subtle control for gripping, for example, a fragile workpiece.

A confirmation test explained below was performed to confirm that the robot 1 according to the first embodiment is capable of suppressing oscillation by feedback-controlling the outputs of the gyro sensors 30 and 31.

Figure 8A:
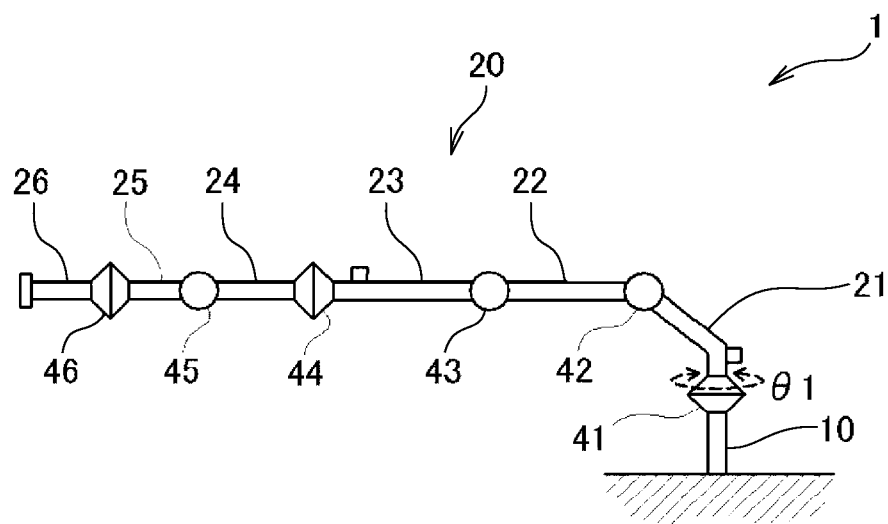
FIGS. 8A and 8B are explanatory diagrams concerning confirmation conditions for a damping effect obtained by using the robot according to the first embodiment.
Figure 8B:
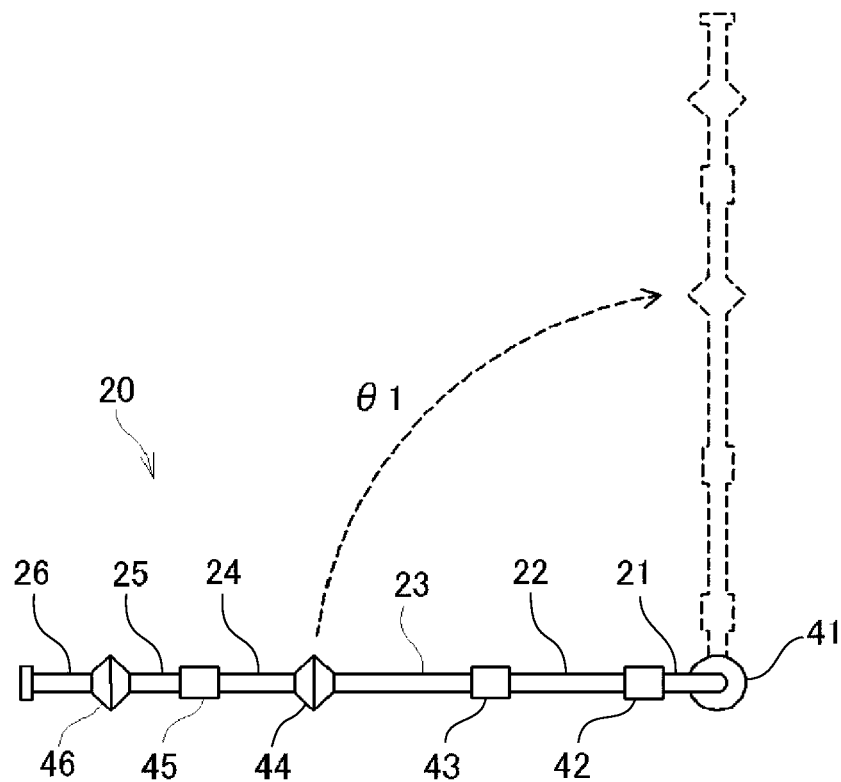

FIGS. 8A and 8B are explanatory diagrams concerning confirmation conditions for a damping effect obtained by using the robot 1 according to the first embodiment. FIG. 8A is a front view and FIG. 8B is a top view. First, as shown in FIG. 8A, the joints 42 to 46 were fixed to stretch the arm members 22 to 26 of the robot 1 horizontally. The joint 41 was rotated in the horizontal direction. The entire arm 20 shown in FIG. 8B was rotated 90° clockwise and stopped. A laser type displacement gauge was provided in a position where the distal end of the arm 20 was stopped. Displacement (oscillation) of the distal end of the arm 20 was measured.

When the arm 20 was rotated, the joint 41 was driven at maximum angular acceleration of 2200°/s$^2$ and maximum angular velocity of 275°/s. A member to be measured of 3 kg was attached to the distal end of the arm 20. Note that a laser of the laser type displacement gauge was irradiated on the surface of the member to be measured to measure displacement of the distal end of the arm 20.

Figure 9:
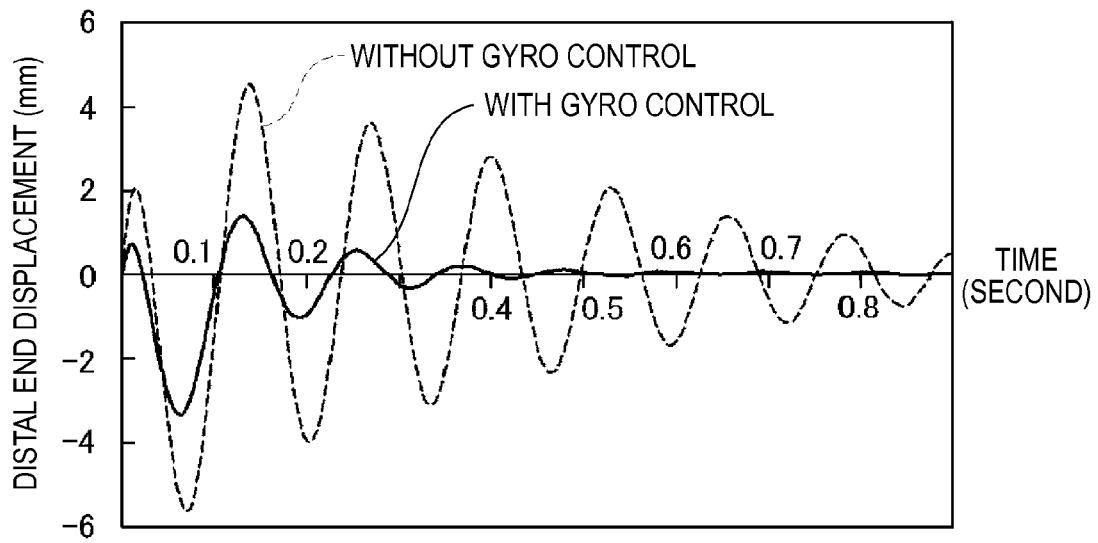
FIG. 9 is an explanatory diagram showing a measurement result of the damping effect obtained by using the robot according to the first embodiment.

FIG. 9 is an explanatory diagram showing a measurement result of the damping effect obtained by using the robot 1 according to the first embodiment. The ordinate in the figure indicates displacement (unit: mm) of the member to be measured at the distal end of the arm 20 measured by the laser type displacement gauge. The abscissa indicates an elapsed time (unit: second) from a point in time when the arm 20 is rotated 90° (an instance when the member to be measured at the distal end of the arm 20 passes a target position for the first time). A control cycle of the robot 1 was set to 8 kHz. The displacement of the distal end of the arm 20 was measured at a sampling interval of 1 msec.

A broken line shown in FIG. 9 represents a measurement result obtained when the outputs of the gyro sensors 30 and 31 were not feedback-controlled (without gyro control). On the other hand, a solid line shown in FIG. 9 represents a measurement result obtained when the outputs of the gyro sensors 30 and 31 were feedback-controlled (with gyro control). As it is evident from the figures, it can be confirmed that the oscillation of the distal end of the arm can be greatly suppressed by feedback-controlling the outputs of the gyro sensors 30 and 31. Note that the gain coefficient Ka during the gyro control is set to an appropriate value.

Figure 10:
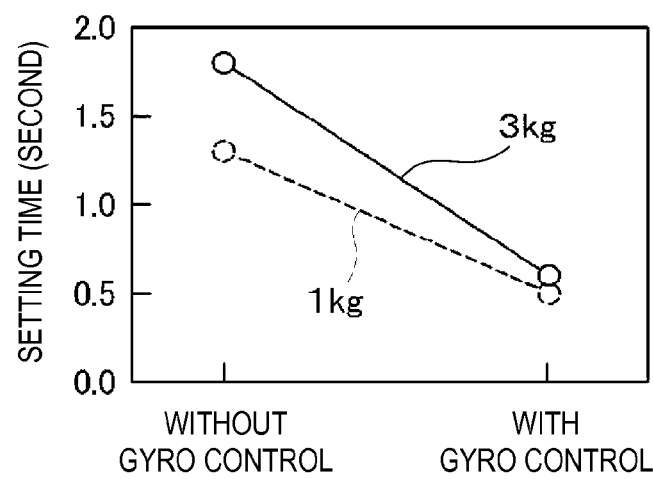
FIG. 10 is an explanatory diagram showing a measurement result of a settling time calculated by using the robot according to the first embodiment.

FIG. 10 is an explanatory diagram showing a measurement result of a settling time calculated by a confirmation test performed by horizontally rotating the arm 20. The settling time is time required until the amplitude of displacement decreases to ±0.05 mm or less after the distal end of the arm 20 passes a stop position (in this case, a position to which the joint 41 rotates 90°) for the first time. Note that, in the figure, a solid line indicates a measurement result obtained when a member to be measured of 3 kg was attached to the distal end of the arm 20. A broken line indicates a measurement result obtained when a member to be measured of 1 kg was attached to the distal end of the arm 20.

As shown in the figure, under a condition that the member to be measured at the distal end of the arm 20 was 3 kg, whereas the settling time without gyro control was 1.8 seconds, the settling time was reduced to 0.6 second when the gyro control was performed. Under a condition that the member to be measured at the distal end of the arm 20 was 1 kg, whereas the settling time without gyro control was 1.3 seconds, the settling time was reduced to 0.5 second when the gyro control was performed. Naturally, even when the weight of the member to be measured attached to the distal end of the arm 20 is other than 1 kg and 3 kg, it is possible to greatly reduce the settling time by performing the gyro control. In this way, under a condition in which suppression of the oscillation of the arm is more difficult, it is possible to obtain a larger oscillation suppression effect by feedback-controlling the outputs of the gyro sensors 30 and 31.

The confirmation test of the oscillation suppression effect by the gyro control was also performed when the arm 20 was rotated in a direction different from the horizontal direction.

Figure 11:
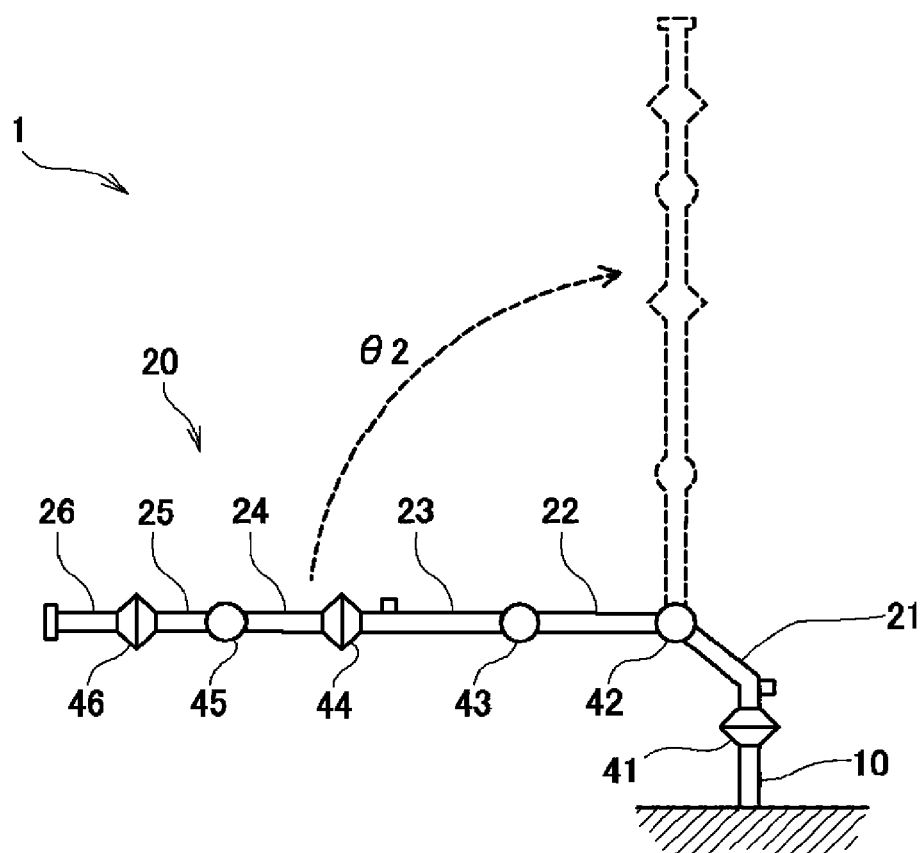
FIG. 11 is an explanatory diagram concerning a confirmation condition for the damping effect obtained by using the robot according to the first embodiment.

FIG. 11 is an explanatory diagram concerning a confirmation condition for the damping effect obtained by using the robot 1 according to the first embodiment. As shown in FIG. 11, from a state in which the arm members 22 to 26 stretched horizontally, the joint 42 was rotated 90° upward in the vertical direction and stopped. As a result, the arm members 22 to 26 further on the distal end side than the joint 42 performed a swung-up action. A laser type displacement gauge was provided in a position where the distal end of the arm 20 was stopped. Displacement (oscillation) of the distal end of the arm 20 was measured.

When the arm 20 was rotated, the joint 42 was driven at maximum angular acceleration of 2200°/s$^2$ and maximum angular velocity of 275°/s. A member to be measured of 3 kg was attached to the distal end of the arm 20. Note that a laser of the laser type displacement gauge was irradiated on the surface of the member to be measured to measure displacement of the distal end of the arm 20.

Figure 12:
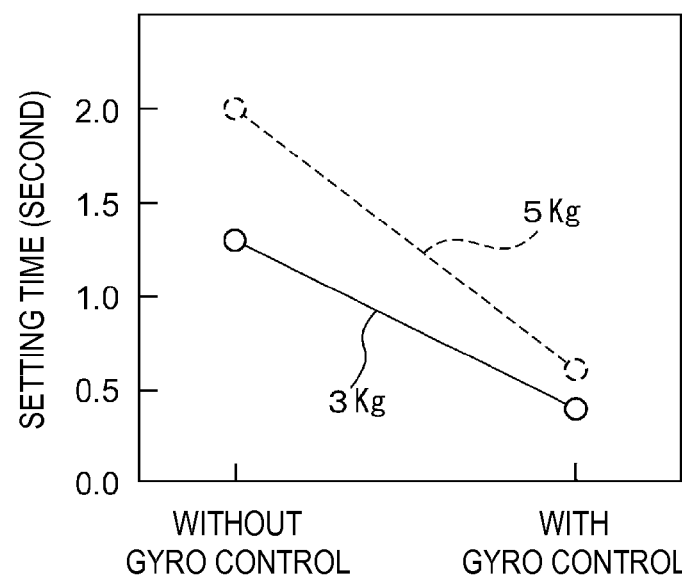
FIG. 12 is an explanatory diagram showing a measurement result of the settling time calculated by using the robot according to the first embodiment.

FIG. 12 is an explanatory diagram showing a measurement result of a settling time calculated by a confirmation test performed when the arm 20 was swung up. The settling time measured when the arm 20 is swung up (or swung down) is defined as time required until the amplitude of the displacement decreases to ±0.1 mm or less after the distal end of the arm 20 passes a stop position (in this case, a position to which the joint 42 rotates 90°) for the first time. In the figure, a solid line indicates a measurement result obtained when a member to be measured of 3 kg was attached to the distal end of the arm 20. A broken line indicates a measurement result obtained when a member to be measured of 5 kg was attached to the distal end of the arm 20.

Under a condition that the member to be measured at the distal end of the arm 20 was 3 kg, as indicated by the solid line in the figure, whereas the settling time without gyro control was 1.3 seconds, the settling time was reduced to 0.4 second when the gyro control was performed. Under a condition that the member to be measured at the distal end of the arm 20 was 5 kg, as indicated by the broken line in the figure, whereas the settling time without gyro control was 2.0 seconds, the settling time was reduced to 0.6 second when the gyro control was performed. Naturally, even when the weight of the member to be measured attached to the distal end of the arm 20 is other than 3 kg and 5 kg, it is possible to greatly reduce the settling time by performing the gyro control. In this way, even when the arm 20 is swung up (or swung down), under a condition in which suppression of the oscillation of the arm 20 is more difficult, it can be confirmed that it is possible to obtain a larger oscillation suppression effect by feedback-controlling the outputs of the gyro sensors 30 and 31.

Modifications of the robot 1 according to the first embodiment are briefly explained focusing on differences from the first embodiment. Note that, in the explanation of the modifications, components same as the components in the first embodiment are denoted by the same reference numerals and redundant explanation of the components is omitted.

First Modification

Figure 13:
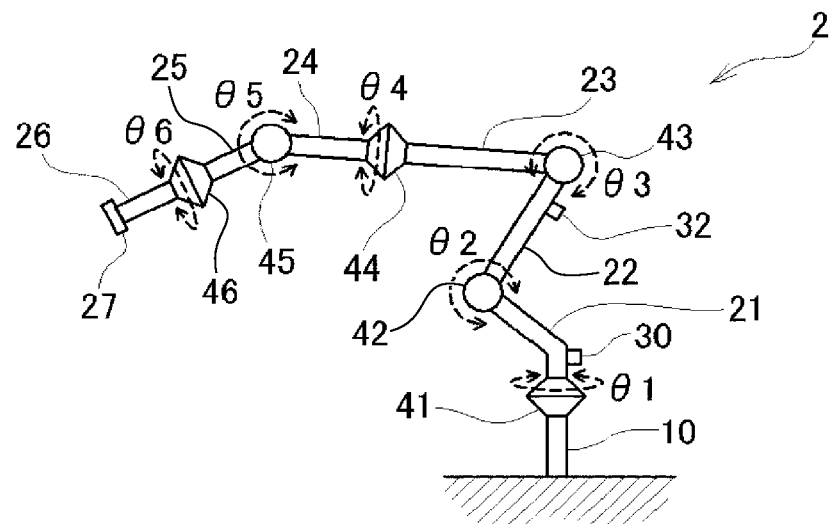
FIG. 13 is an explanatory diagram showing the configuration of a robot according to a first modification.

FIG. 13 is an explanatory diagram showing the configuration of a robot 2 according to a first modification. In the first embodiment, the gyro sensor 30 is mounted on the arm member 21 and the gyro sensor 31 is mounted on the arm member 23. However, a gyro sensor 32 may be mounted on the arm member 22 instead of the gyro sensor 31 mounted on the arm member 23.

In this case, control of the second motor 42m that drives the arm member 22 mounted with the gyro sensor 32 is the same as the control of the first motor 41m that drives the arm member 21 mounted with the gyro sensor 30. Therefore, control contents of the second motor control unit 52 in the robot 2 according to the first modification are the same as the control contents of the first motor control unit 51 explained with reference to FIG. 4.

Since the gyro sensor 31 is not mounted on the arm member 23 of the robot 2 according to the first modification, control of the third motor 43m that drives the arm member 23 is the same as the control of the fourth motor 44m that drives the arm member 24, the fifth motor 45m that drives the arm member 25, and the sixth motor 46m that drives the arm member 26. Therefore, control contents of the third motor control unit 53 in the robot 2 according to the first modification are the same as the control contents of the fourth motor control unit 54, the fifth motor control unit 55, and the sixth motor control unit 56 explained with reference to FIGS. 3A to 3C.

Second Modification

Figure 14:
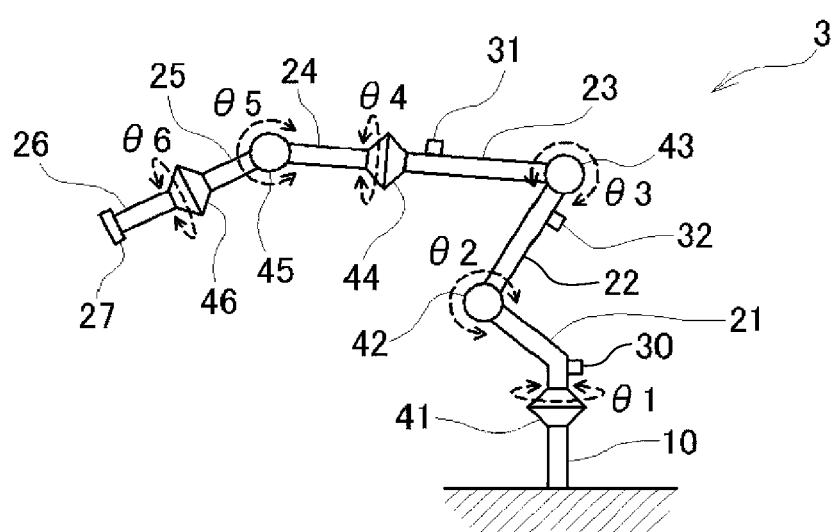
FIG. 14 is an explanatory diagram showing the configuration of a robot according to a second modification.

FIG. 14 is an explanatory diagram showing the configuration of a robot 3 according to a second modification. In the first embodiment and the first modification, the gyro sensor 30 of the arm member 21 and the gyro sensor 31 of the arm member 23 or the gyro sensor 32 of the arm member 22 are mounted. However, in addition to the gyro sensor 30 of the arm member 21 and the gyro sensor 31 of the arm member 23, the gyro sensor 32 may be mounted on the arm member 22.

In this case, control of the second motor 42m that drives the arm member 22 mounted with the gyro sensor 32 and control of the third motor 43m that drives the arm member 23 mounted with the gyro sensor 31 are the same as control of the first motor 41m that drives the arm member 21 mounted with the gyro sensor 30. Therefore, control contents of the second motor control unit 52 and control contents of the third motor control unit 53 in the robot 3 according to the second modification only have to be the same as the control contents of the first motor control unit 51 explained with reference to FIG. 4.

In the robot 3 according to the second modification shown in FIG. 14, the rotation axis of the second motor 42m that drives the arm member 22 mounted with the gyro sensor 32 and the rotation axis of the third motor 43m that drives the arm member 23 mounted with the gyro sensor 31 are parallel to each other. Therefore, the output of the gyro sensor 31 may be corrected using the output of the gyro sensor 32 rather than independently performing the control of the second motor 42m using the gyro sensor 32 and the control of the third motor 43m using the gyro sensor 31.

Figure 15:
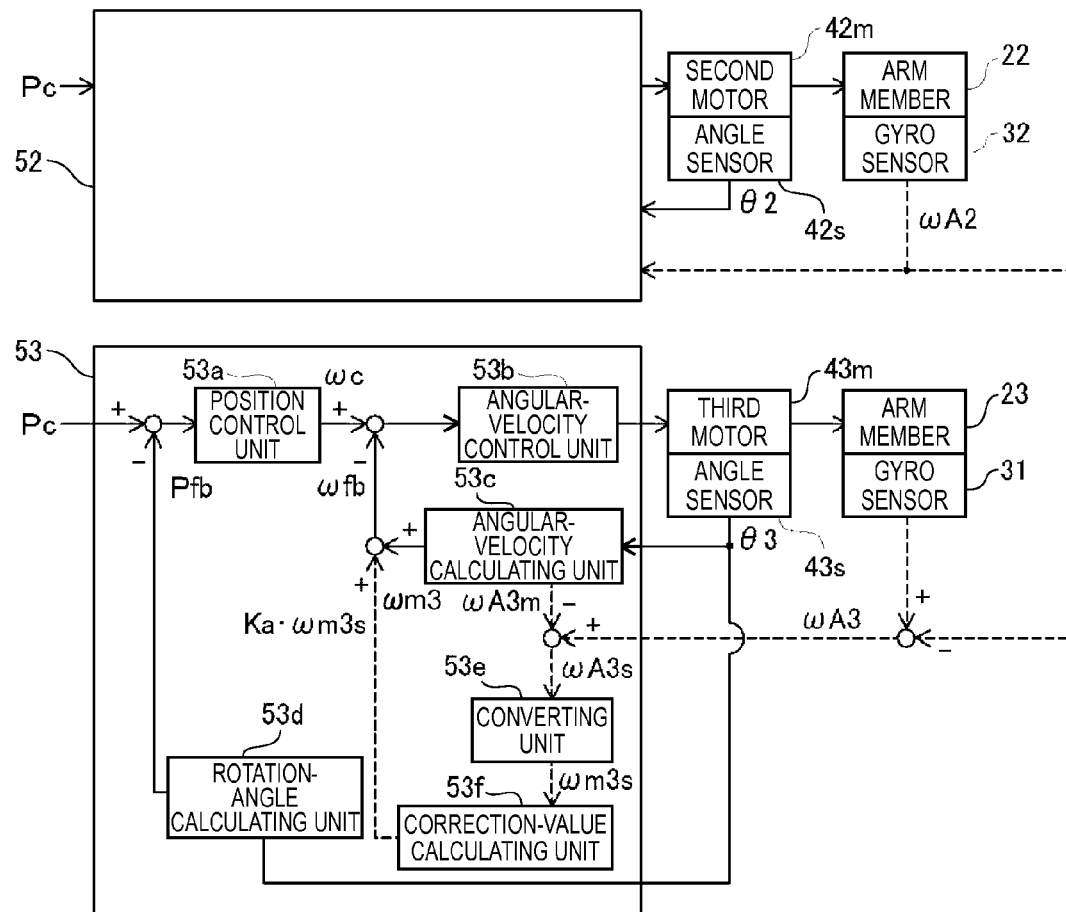
FIG. 15 is a block diagram showing the operation of a second motor control unit and a third motor control unit in the robot according to the second modification.

FIG. 15 is a block diagram showing the operations of the second motor control unit 52 and the third motor control unit 53 in the robot 3 according to the second modification. Control contents performed by the second motor control unit 52 and the third motor control unit 53 when the output of the gyro sensor 31 is corrected using the output of the gyro sensor 32 in the robot 3 are explained with reference to FIG. 15.

As explained above, the control contents performed by the second motor control unit 52 and the third motor control unit 53 are the same as control contents of the first motor control unit 51 explained with reference to FIG. 4. However, in the second modification shown in FIG. 15, the angular velocity $\omega A3$ detected by the gyro sensor 31 is not directly input to the third motor control unit 53 and is input to the third motor control unit 53 after the angular velocity $\omega A2$ detected by the gyro sensor 32 is subtracted therefrom.

A reason for this is as explained below. First, since the rotation axis of the second motor 42m and the rotation axis of the third motor 43m are parallel, the angular velocity $\omega A3$ detected by the gyro sensor 31 includes not only angular velocity due to the driving of the arm member 23 by the third motor 43m but also angular velocity due to the driving of the arm member 22 by the second motor 42m. Therefore, by subtracting the angular velocity $\omega A2$ detected by the gyro sensor 32 from the angular velocity $\omega A3$ detected by the gyro sensor 31, it is possible to accurately detect the angular velocity due to the driving of the arm member 23 by the third motor 43m. As a result, since the oscillation acceleration $\omega A3s$ of the arm member 23 can be more accurately detected and feedback to the control of the third motor 43m, it is possible to quickly suppress the oscillation of the arm 20.

Second Embodiment

Figure 16A:
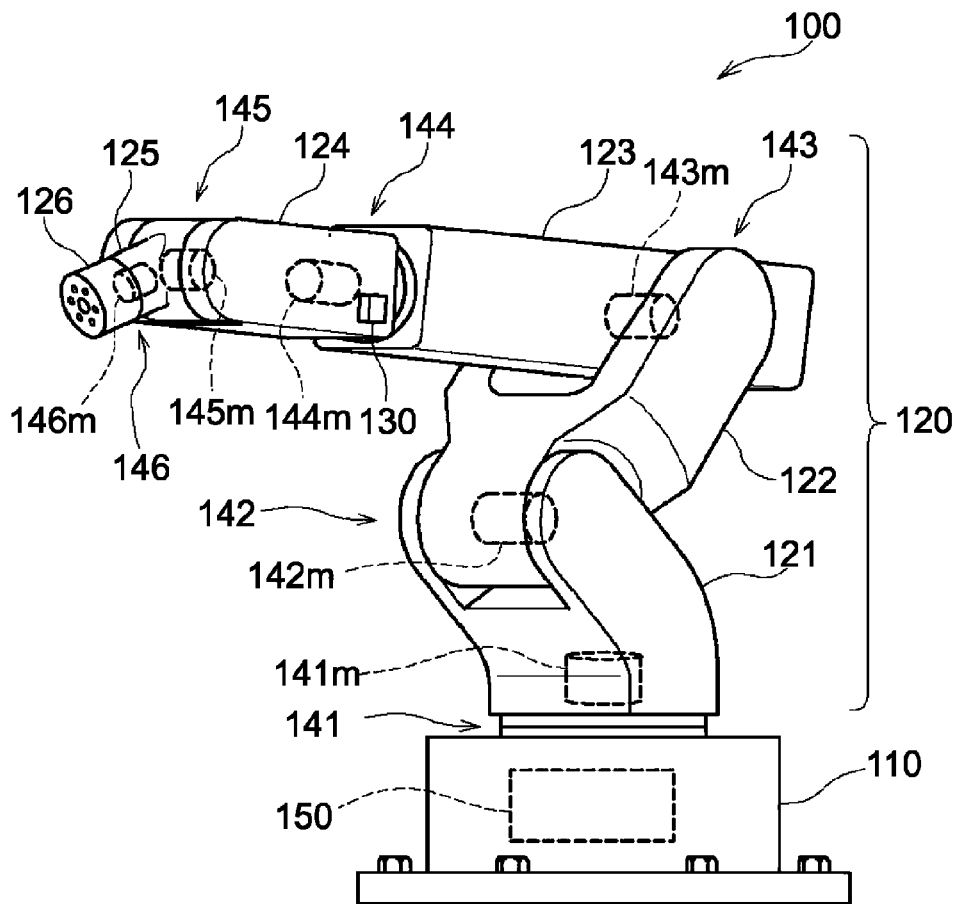
FIGS. 16A and 16B are explanatory diagrams showing the overall structure of a robot according to a second embodiment.
Figure 16B:
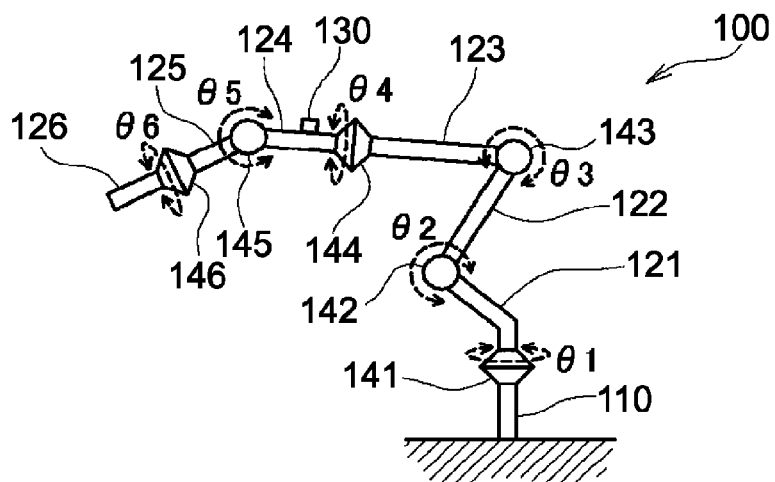

FIGS. 16A and 16B are explanatory diagrams showing the overall structure of a robot 100 according to a second embodiment. In FIG. 16A, a rough external shape of the robot 100 according to the second embodiment is shown. As shown in the figure, the robot 100 according to the second embodiment includes a base 110 set on the ground, an arm 120 turnably attached to the base 110, and a control unit 150 mounted in the base 110 and configured to control the operation of the entire robot 100.

The arm 120 includes six arm members 121, 122, 123, 124, 125, and 126 and six joints 141, 142, 143, 144, 145, and 146.

The arm member 121 is turnably (twistably) attached to the base 110 by the joint 141. The arm member 122 is bendably attached to the arm member 121 by the joint 142. The arm member 123 is bendably attached to the arm member 122 by the joint 143. The arm member 124 is turnably (twistably) attached to the arm member 123 by the joint 144. The arm member 125 is bendably attached to the arm member 124 by the joint 145. The arm member 126 is turnably (twistably) attached to the arm member 125 by the joint 146.

Note that not-shown various jigs (so-called end effectors) such as a robot hand (so-called hand section) and a welding jig are attached to the distal end of the arm member 126. The robot 100 according to the second embodiment is a robot in which, when a certain joint is moved, the directions of rotation axes of joints ahead of the joint change (so-called vertical multi-joint robot).

In the portion of the joint 141, a first motor 141m for driving a joint 141 is mounted. Similarly, in the portion of the joint 142, a second motor 142m for driving the joint 142 is mounted. In the portion of the joint 143, a third motor 143m for driving the joint 143 is mounted. In the portion of the joint 144, a fourth motor 144m is mounted. In the portion of the joint 145, a fifth motor 145m is mounted. In the portion of the joint 146, a sixth motor 146m is mounted.

In the robot 100 according to the second embodiment, a gyro sensor 130 is attached to the arm member 124 among the six arm members 121 to 126 of the arm 120. The gyro sensor 130 is a sensor capable of outputting angular velocities (or inertial forces) around predetermined three axes (an X axis, a Y axis, and a Z axis) set as rotation axes orthogonal to one another. The gyro sensor 130 is attached in a direction in which a rotation axis of the joint 144 coincides with any one of the axes of the gyro sensor 130. Note that an acceleration sensor may be used instead of the gyro sensor 130 that detects angular velocity. The gyro sensor 130 according to the second embodiment corresponds to the "angular velocity sensor" according to the invention.

As the gyro sensor 130, as in the first embodiment, an oscillation type gyro sensor of a piezoelectric system that detects angular velocity is adopted. Therefore, explanation of the gyro sensor 130 is omitted.

In FIG. 16B, a positional relation among the arm members 121 to 126, the joints 141 to 146, and the gyro sensor 130 included in the robot 100 according to the second embodiment is schematically shown.

As shown in FIG. 16B, an angle of the joint 141 is represented by rotation angle θ1, which is a rotation angle of the first motor 141m. An angle of the joint 142 is represented by rotation angle θ2, which is a rotation angle of the second motor 142m. An angle of the joint 143 is represented by rotation angle θ3, which is a rotation angle of the third motor 143m. An angle of the joint 144 is represented by rotation angle θ4, which is a rotation angle of the fourth motor 144m. An angle of the joint 145 is represented by rotation angle θ5, which is a rotation angle of the fifth motor 145m. An angle of the joint 146 is represented by rotation angle θ6, which is a rotation angle of the sixth motor 146m.

Figure 17:
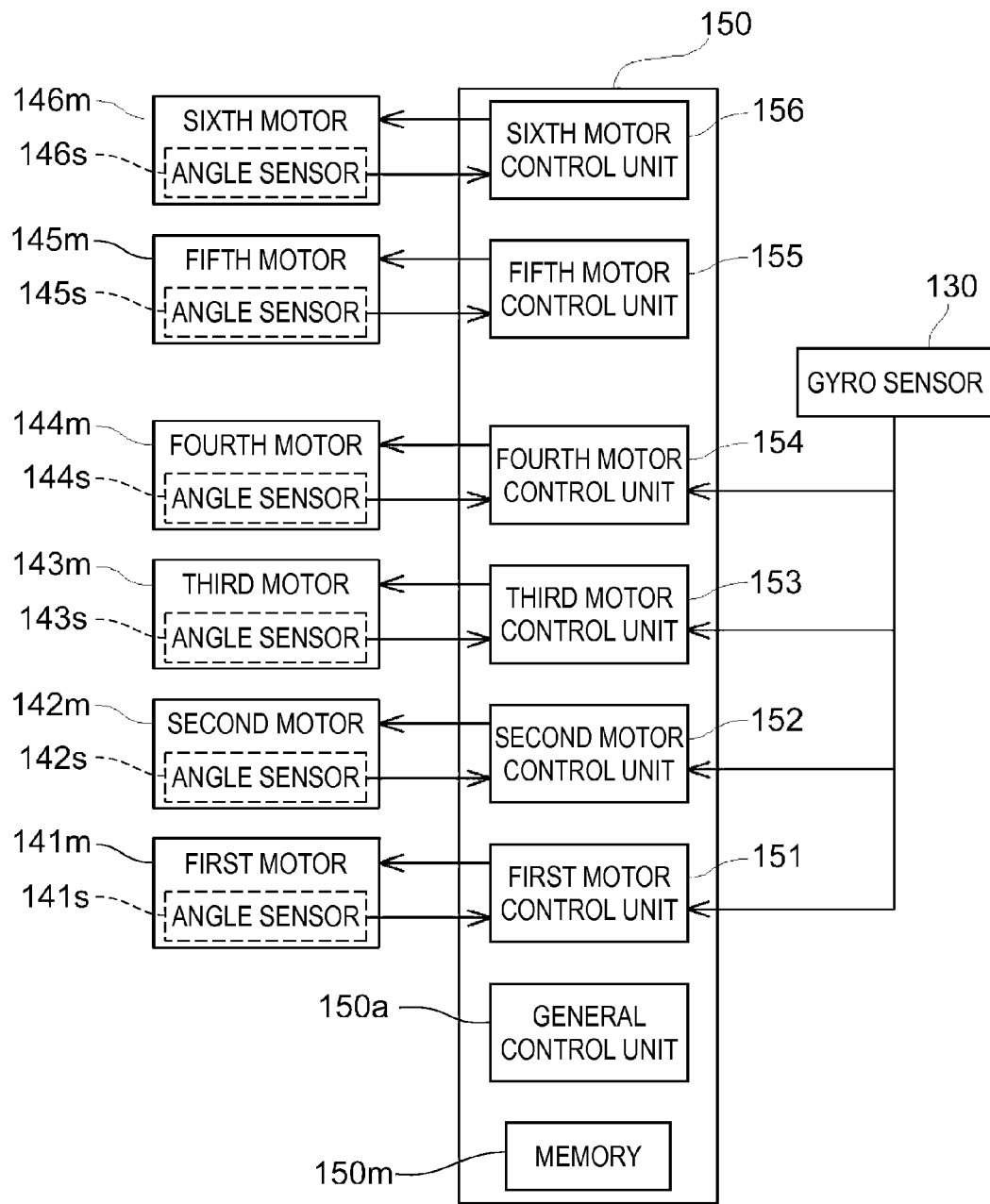
FIG. 17 is a block diagram showing the internal configuration of a control unit according to the second embodiment.

FIG. 17 is a block diagram showing the internal configuration of the control unit 150 according to the second embodiment. As shown in the figure, the control unit 150 is mounted with, for example, a first motor control unit 151 for controlling the first motor 141m, a second motor control unit 152 for controlling the second motor 142m, a third motor control unit 153 for controlling the third motor 143m, a fourth motor control unit 154 for controlling the fourth motor 144m, a fifth motor control unit 155 for controlling the fifth motor 145m, a sixth motor control unit 156 for controlling the sixth motor 146m, a general control unit 150a for controlling the operation of the entire robot 100, and a memory 150m having stored therein a control program and the like.

The first motor 141m is mounted with an angle sensor 141s that detects the rotation angle θ1 of the first motor 141m. Similarly, the second motor 142m is mounted with an angle sensor 142s that detects the rotation angle θ2 of the second motor 142m. The third motor 143m is mounted with an angle sensor 143s that detects the rotation angle θ3 of the third motor 143m. The fourth motor 144m is mounted with an angle sensor 144s that detects the rotation angle θ4 of the fourth motor 144m. The fifth motor 145m is mounted with an angle sensor 145s that detects the rotation angle θ5 of the fifth motor 145m. The sixth motor 146m is mounted with an angle sensor 146s that detects the rotation angle θ6 of the sixth motor 146m.

The respective motor control units (the first motor control unit 151 to the sixth motor control unit 156) control the operations of the respective motors (the first motor 141m to the sixth motor 146m) on the basis of outputs from the angle sensors 141s to 146s mounted on the motors (the first motor 141m to the sixth motor 146m) set as control targets.

For example, the sixth motor control unit 156 controls the operation of the sixth motor 146m on the basis of the rotation angle θ6 detected by the angle sensor 146s. Similarly, the first motor control unit 151 to the fifth motor control unit 155 control the operations of the first motor 141m to the fifth motor 145m on the basis of the rotation angles θ1 to θ5 detected by the angle sensors 141s to 145s.

However, the first motor control unit 151 to the fourth motor control unit 154 control the operations of the first motor 141m to the fourth motor 144m using not only the rotation angles θ1 to θ4 detected by the angle sensors 141s to 144s but also an output of the gyro sensor 130. Details of the control performed by the motor control units (the first motor control unit 151 to the sixth motor control unit 156) are explained below.

Control targets of the fifth motor control unit 155 and the sixth motor control unit 156 are different. That is, the fifth motor control unit 155 and the sixth motor control unit 156 respectively control the fifth motor 145m and the sixth motor 146m. However, control contents thereof are basically the same. Therefore, control by the sixth motor control unit 156 is explained as an example. Control targets of the first motor control unit 151 to the fourth motor control unit 154 are different. That is, the first motor control unit 151 to the fourth motor control unit 154 respectively control the first motor 141m to the fourth motor 144m. However, control contents thereof are basically the same. Therefore, control by the fourth motor control unit 154 is explained as an example.

Figure 18:
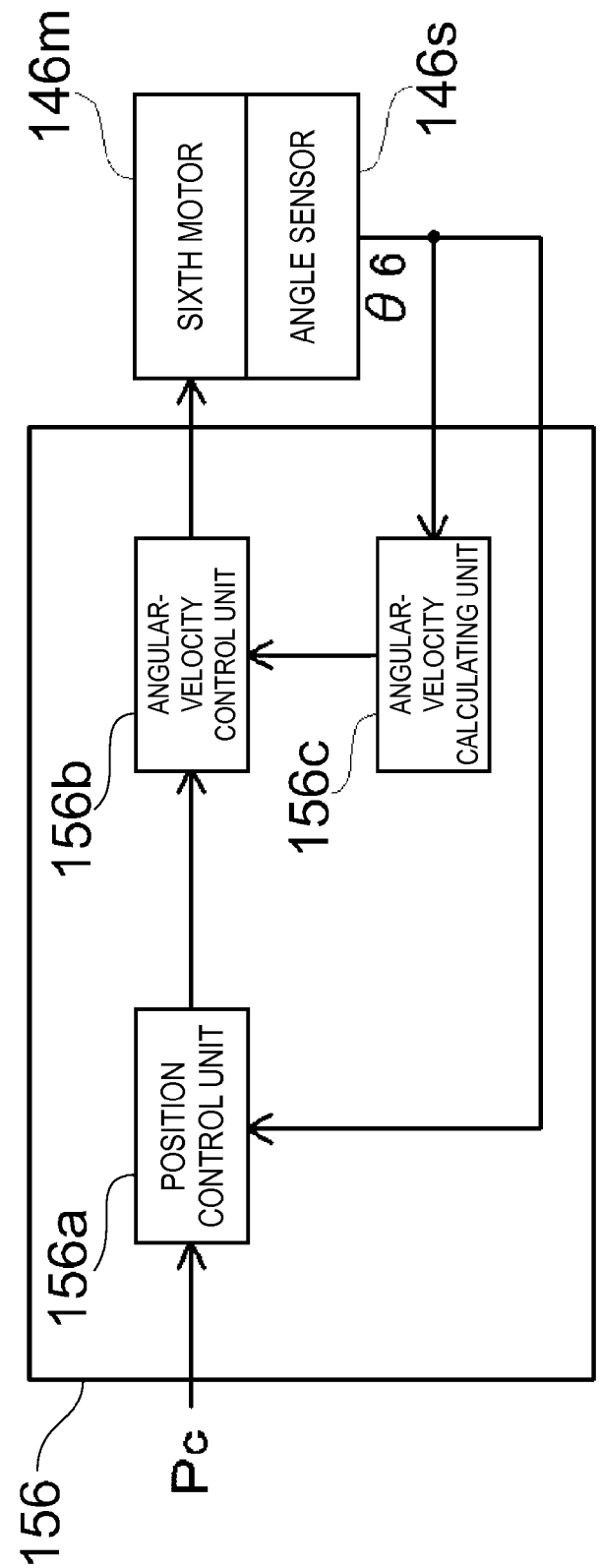
FIG. 18 is a block diagram showing control performed by a sixth motor control unit.

FIG. 18 is a block diagram showing control performed by the sixth motor control unit 156. The sixth motor control unit 156 receives the target position Pc from the general control unit 150a and performs control to set the rotation angle θ6 detected by the angle sensor 146s to the target position Pc. The sixth motor control unit 156 basically has a control structure including a large loop for feedback-controlling position information from the rotation angle θ6 detected by the angle sensor 146s and a small loop for feedback-controlling angular velocity from the rotation angle θ6.

As shown in FIG. 18, the target position Pc received from the general control unit 150a is input to a position control unit 156a. The rotation angle θ6 detected by the angle sensor 146s is input to the position control unit 156a. The position control unit 156a generates target angular velocity corresponding to a deviation between the target position Pc and the rotation angle θ6 and inputs the target angular velocity to an angular-velocity control unit 156b. The rotation angle θ6 detected by the angle sensor 146s is input to an angular-velocity calculating unit 156c and converted into angular velocity and then input to the angular-velocity control unit 156b.

The angular-velocity control unit 156b controls the operation of the sixth motor 146m according to a deviation between the target angular velocity input from the position control unit 156a and the angular velocity input from the angular-velocity calculating unit 156c. A result of the control is reflected on the rotation angle θ6 detected by the angle sensor 146s and is input to the position control unit 156a, whereby position feedback control is performed (the large loop). The control result is input to the angular-velocity control unit 156b via the angular-velocity calculating unit 156c, whereby angular velocity feedback control is performed (the small loop).

Figure 19:
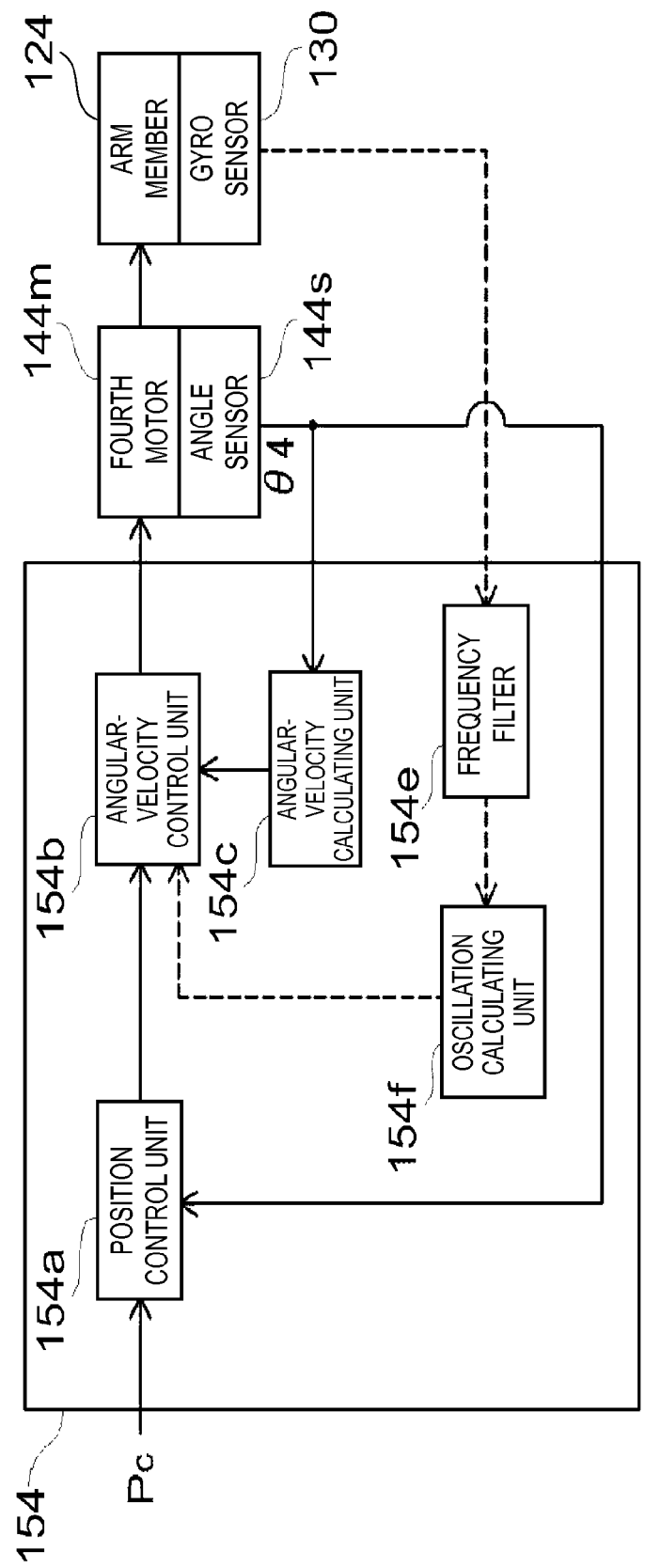
FIG. 19 is a block diagram showing control performed by a fourth motor control unit.

FIG. 19 is a block diagram showing control performed by the fourth motor control unit 154. Like the sixth motor control unit 156, the fourth motor control unit 154 performs control using the rotation angle θ4 detected by the angle sensor 144s.

However, the fourth motor control unit 154 controls the operation of the fourth motor 144m using an output of the gyro sensor 130 as well. Therefore, the control performed by the fourth motor control unit 154 is a combination of the position feedback control and the angular velocity feedback control performed using the rotation angle θ4 detected by the angle sensor 144s and the angular velocity feedback control performed using the output of the gyro sensor 130. In FIG. 19, the position feedback control and the angular velocity feedback control performed using the rotation angle θ4 are represented by solid line arrows. The angular velocity feedback control performed using the output of the gyro sensor 130 is represented by broken line arrows.

In the fourth motor control unit 154, as in the sixth motor control unit 156, the target position Pc received from the general control unit 150a and the rotation angle θ4 detected by the angle sensor 144s are input to a position control unit 154a. The position control unit 154a generates target angular velocity corresponding to a deviation between the target position Pc and the rotation angle θ4 and inputs the target angular velocity to an angular-velocity control unit 154b. The rotation angle θ4 detected by the angle sensor 144s is input to an angular-velocity calculating unit 154c and converted into angular velocity and then input to the angular-velocity control unit 154b. The angular-velocity control unit 154b controls the operation of the fourth motor 144m according to a deviation between the target angular velocity input from the position control unit 154a and the angular velocity input from the angular-velocity calculating unit 154c. Further, the output of the gyro sensor 130 is input to the angular-velocity control unit 154b via a frequency filter 154e and an oscillation calculating unit 154f and reflected on the control of the fourth motor 144m.

The frequency filter 154e allows a frequency corresponding to the oscillation of the arm member 124 in the angular velocity output from the gyro sensor 130 to pass. Note that, in the robot 100 according to the second embodiment, the frequency filter 154e is used to obtain the angular velocity corresponding to the oscillation of the arm member 124. However, the angular velocity may be calculated by subtracting, from the angular velocity output from the gyro sensor 130, angular velocities of the motors (the first motor 141m to the fourth motor 144m) further on the base 110 side than the gyro sensor 130.

The oscillation calculating unit 154f extracts an angular velocity component (oscillation angular velocity) around the rotation axis of the joint 144 from the angular velocity of the frequency passed through the frequency filter 154e and inputs the angular velocity component to the angular-velocity control unit 154b. Note that, although not shown in the figure, an oscillation calculating unit 153f of the third motor control unit 153 extracts an angular velocity component around the rotation axis of the joint 143. An oscillation calculating unit 152f of the second motor control unit 152 extracts an angular velocity component around the rotation axis of the joint 142. An oscillation calculating unit 151f of the first motor control unit 151 extracts an angular velocity component around the rotation axis of the joint 141. The angular-velocity control unit 154b controls the operation of the fourth motor 144m to attenuate the oscillation angular velocity input from the oscillation calculating unit 154f.

When the angular-velocity control unit 154b controls the fourth motor 144m, the rotation angle θ4 detected by the angle sensor 144s changes. When the arm member 124 is rotated by the fourth motor 144m, the gyro sensor 130 outputs angular velocity. The rotation angle θ4 detected by the angle sensor 144s is input to the position control unit 154a, whereby the position feedback control is performed. The rotation angle θ4 is input to the angular-velocity control unit 154b via the angular-velocity calculating unit 154c, whereby the angular velocity feedback control is performed. The angular velocity output by the gyro sensor 130 is input to the angular-velocity control unit 154b via the frequency filter 154e and the oscillation calculating unit 154f, whereby the angular velocity feedback control is performed.

In particular, even if the rotation angle θ4 detected by the angle sensor 144s reaches the target position Pc and the fourth motor 144m is stopped, the arm 120 oscillates for a while. Therefore, feedback control is performed using the output of the gyro sensor 130.

By performing the feedback control of the motors (the first motor 141m to the fourth motor 144m) further on the base 110 side than the gyro sensor 130 using the output of the gyro sensor 130 in this way, it is possible to suppress the oscillation of the arm 120.

However, in the robot 100 including a large number of joints in the arm 120, if the gyro sensor 130 is mounted at the distal end of the arm 120, when the feedback control of the motors is performed using the output of the gyro sensor 130, the oscillation of the arm 120 is amplified to the contrary.

Figure 20A:
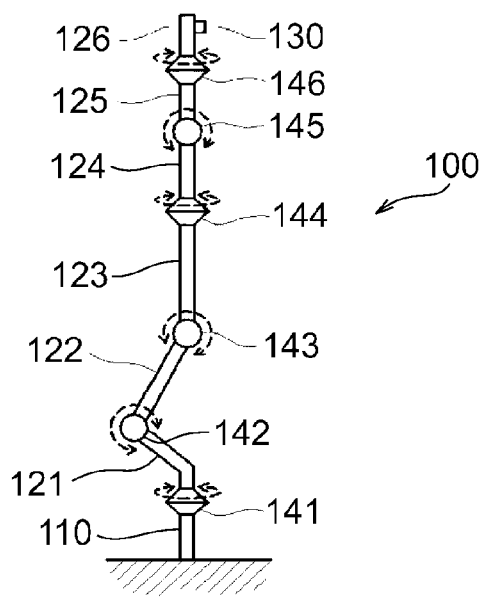
FIGS. 20A to 20C are explanatory diagrams showing a reason why oscillation of an arm is amplified when feedback control is performed using an output of a gyro sensor mounted at the distal end of the arm.
Figure 20B:
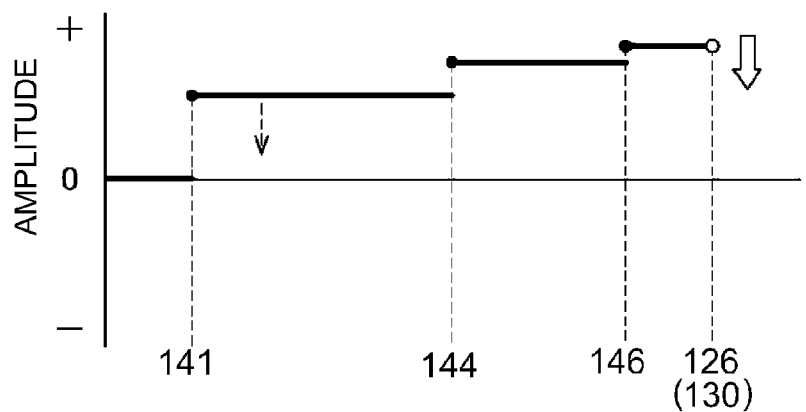
Figure 20C:
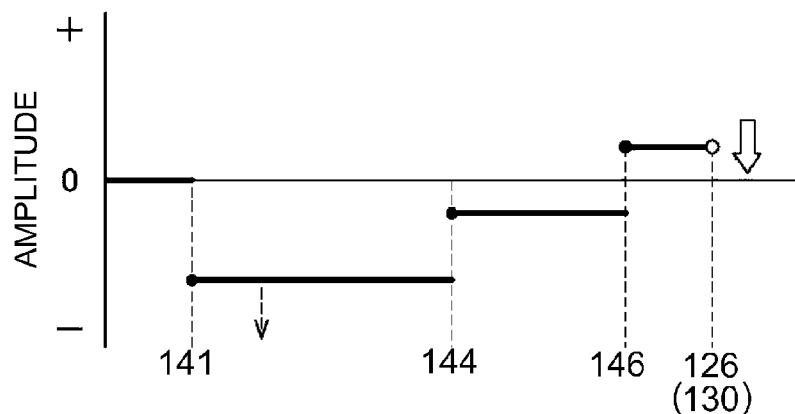

FIGS. 20A to 20C are explanatory diagrams for explaining a reason why, if the gyro sensor 130 is mounted at the distal end of the arm 120, the oscillation of the arm 120 is amplified when the feedback control is performed using the output of the gyro sensor 130.

FIG. 20A is an explanatory diagram concerning a confirmation condition for a damping effect obtained by using the robot 100 in which the gyro sensor 130 is mounted at the distal end of the arm 120. First, in a state shown in FIG. 20A, the joint 142, the joint 143, and the joint 145 are rotated and stopped in a position where the rotation axes of the joint 141, the joint 144, and the joint 146 are placed on the same straight line. The joint 141, the joint 144, and the joint 146 are rotated and stopped to set a robot hand (not shown in the figure) mounted at the distal end of the arm member 126 in a predetermined direction with respect to a target object. In this case, oscillation around the rotation axes of the joints is generated in the arm 120 by a reaction of the stop of the joints.

FIGS. 20B and 20C are diagrams showing oscillation (rotation) coaxial with the rotation axis of the joint 141 in the oscillation of the arm 120. Examples of oscillation modes of the arm oscillation are shown. The abscissa represents positions from the proximal end side (the base 110 side) to the distal end side (the arm member 126 side) of the arm 120. The ordinate represents a deviation (an angle) due to oscillation with respect to a state in which no oscillation occurs. The oscillation mainly occurs in a twisting joint. Therefore, explanation of other factors (deformation of the arm members, etc.) is omitted.

The amplitudes of the oscillations of the arm member 126 and the joint 146 are equal and are obtained by compounding the amplitudes of the oscillations of the joint 141, the joint 144, and the joint 146. The amplitude of the oscillation of the joint 144 is obtained by compounding the amplitudes of the oscillations of the joint 141 and the joint 144. A difference between the amplitudes of the oscillations of the joint 146 and the joint 144 is the amplitude of the oscillation due to the joint 146. A difference between the amplitudes of the oscillations of the joint 144 and the joint 141 is the amplitude of the oscillation due to the joint 144. Note that, in FIGS. 20B and 20C, when the arm member 126 side is viewed from the base 110 side, clockwise rotation is a (+) direction and counterclockwise rotation is a (−) direction.

In the example of the oscillation mode shown in FIG. 20B, first, large oscillation in the (+) direction occurs in the joint 141. Similarly, oscillation in the (+) direction occurs in the joint 144 and the joint 146. Therefore, oscillation in the (+) direction appears in the arm member 126. In this case, the oscillation of the arm 120 can be suppressed by feedback-controlling, on the basis of the output of the gyro sensor 130 mounted on the arm member 126, as indicated by a white arrow in the figure, the first motor 141m of the joint 141 in a direction (the (−) direction) in which the output of the gyro sensor 130 is reduced.

On the other hand, in the example of the oscillation mode shown in FIG. 20C, first, large oscillation in the (−) direction occurs in the joint 141. Although oscillation in the (+)

direction occurs in the joint 144 to cancel the oscillation of the joint 141, since the oscillation is small compared with the oscillation of the joint 141, as a result, oscillation in the (−) direction appears in the joint 144. Further, oscillation in the (+) direction also occurs in the joint 146. As a result, oscillation in the (+) direction appears in the joint 146 and the arm member 126. In this case, on the basis of the output of the gyro sensor 130 mounted on the arm member 126, as indicated by a white arrow in the figure, the first motor 141*m* of the joint 141 is feedback-controlled in a direction (the (−) direction) in which the output of the gyro sensor 130 is reduced. Then, the oscillation of the joint 141 is amplified. Since the oscillation of the joint 141 affects the oscillation of the joint 144 and the joint 146 ahead of the joint 141, oscillation of the entire arm 120 is amplified.

Even when the distal end (the arm member 126) of the arm 120 oscillates in the same direction, modes of the oscillations of the joints are various in the robot 100 including a large number of joints in the arm 120. When the first motor 141*m* of the joint 141 on the base 110 side is feedback-controlled on the basis of the output of the gyro sensor 130 mounted at the distal end of the arm 120, the oscillation of the arm 120 is sometimes amplified. Likelihood of such wrong feedback control is higher as the number of joints (joints turnable coaxially with the rotation axis of the joint 141) interposed between the base 110 and the gyro sensor 130 is larger.

Therefore, in the robot 100 according to the second embodiment, as explained above with reference to FIGS. 16A and 16B, the gyro sensor 130 is mounted on the arm member 124 further on the base 110 side than the third joint 146 counted from the base 110 side among twisting joints (the joint 141, the joint 144, and the joint 146) turnable in a direction in which the arm 120 is twisted.

Figure 21A:
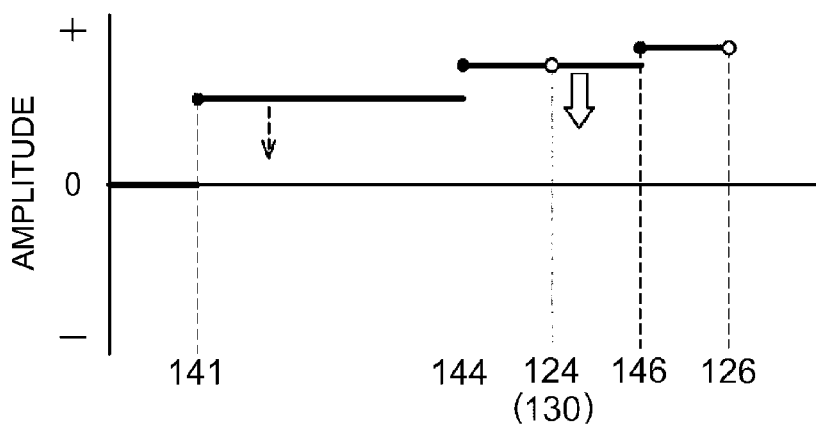
FIGS. 21A and 21B are explanatory diagrams showing an example in which feedback control is performed on the basis of an output of the gyro sensor mounted on an arm member in the robot according to the second embodiment.
Figure 21B:
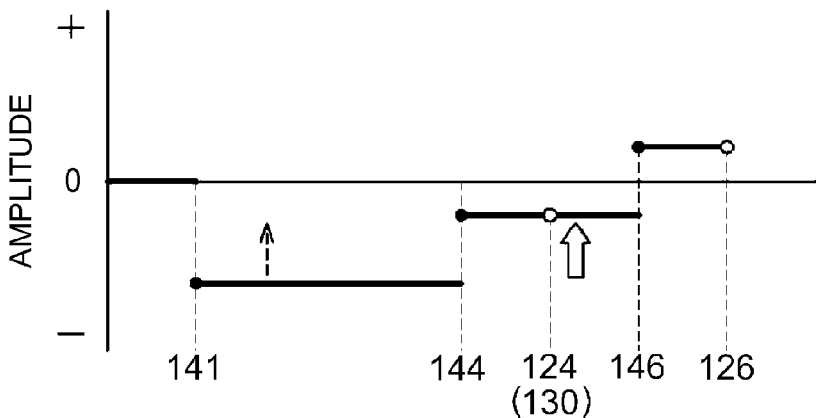

FIGS. 21A and 21B are explanatory diagrams showing examples in which, in the robot 100 according to the second embodiment, feedback control is performed on the basis of the output of the gyro sensor 130 mounted on the arm member 124. In FIG. 21A, an example is shown in which the arm 120 is oscillating in an oscillation mode same as the oscillation mode in FIG. 20B.

The amplitude of the oscillation of the arm member 124 mounted with the gyro sensor 130 is obtained by compounding the amplitudes of the oscillations of the joint 141 and the joint 144. Oscillation in the (+) direction appears in the arm member 124. In this case, the oscillation of the arm 120 can be suppressed by, on the basis of the output of the gyro sensor 130, as indicated by a white arrow in the figure, feedback-controlling the first motor 141*m* of the joint 141 in a direction (the (−) direction) in which the output of the gyro sensor 130 is reduced.

In FIG. 21B, an example is shown in which the arm 120 is oscillating in an oscillation mode same as the oscillation mode in FIG. 20C. In the joint 144, oscillation in the (+) direction occurs to cancel the oscillation (in the (−) direction) of the joint 141. However, the oscillation in the (−) direction still appears in the arm member 124. Therefore, on the basis of the output of the gyro sensor 130, as indicated by a white arrow in the figure, the first motor 141*m* of the joint 141 is feedback-controlled in a direction (the (+) direction) in which the output of the gyro sensor 130 is reduced. Then, the oscillation of the arm 120 can be suppressed.

If the gyro sensor 130 is mounted on the arm member 124 as explained above, unless oscillation of angular velocity in the opposite direction and several times as large as the oscillation of the joint 141 occurs in the joint 144, the oscillation of the arm 120 is not amplified by the feedback control based on the output of the gyro sensor 130.

In general, large oscillation tends to occur in the joint 141 to which a load larger than a load applied to the joint 144 and the joint 146 is applied. Therefore, it is less likely that the oscillation of the angular velocity several times as large as the oscillation of the joint 141 occurs in the joint 144. Therefore, by performing the feedback control based on the output of the gyro sensor 130 mounted on the arm member 124, it is possible to quickly suppress the oscillation of the arm 120 compared with when the feedback control is not performed. As a result, it is possible to improve work efficiency of the robot 100.

In the robot 100 according to the second embodiment, as explained above, bending joints (the joint 142, the joint 143, and the joint 145) turnable in a direction in which the arm 120 is bent are provided between the joint 141 and the joint 144 and between the joint 144 and the joint 146. Therefore, the arm 120 can take various postures in which the axial direction of the rotation axes of the joint 146 and the joint 144 and the axial direction of the rotation axis of the joint 141 are different.

In the robot 100 according to the second embodiment, the gyro sensor 130 is mounted on the arm member 124 connected to the second joint 144 counted from the base 110 side among the twisting joints (the joint 141, the joint 144, and the joint 146) of the arm 120.

Consequently, compared with when the gyro sensor 130 is mounted on the arm member 121 turnable (twistable) with respect to the base 110, a large number of oscillation components accumulated (combined) from the joint 141 to the joint 144 are included in the output of the gyro sensor 130.

As a result, oscillation is amplified and detection accuracy of oscillation by the gyro sensor 130 is improved. Further, oscillation components in the directions of all the three axes generated in the four joints 141 to 144 can be detected. Therefore, it is possible to effectively feedback-control the first motor 141*m* to the fourth motor 144*m* of the four joints 141 to 144 on the basis of the output of one gyro sensor 130. By feedback-controlling the first motor 141*m* to the fourth motor 144*m* of the four joints 141 to 144 in this way, it is possible to more finely suppress the oscillation of the arm 120.

Figure 22:
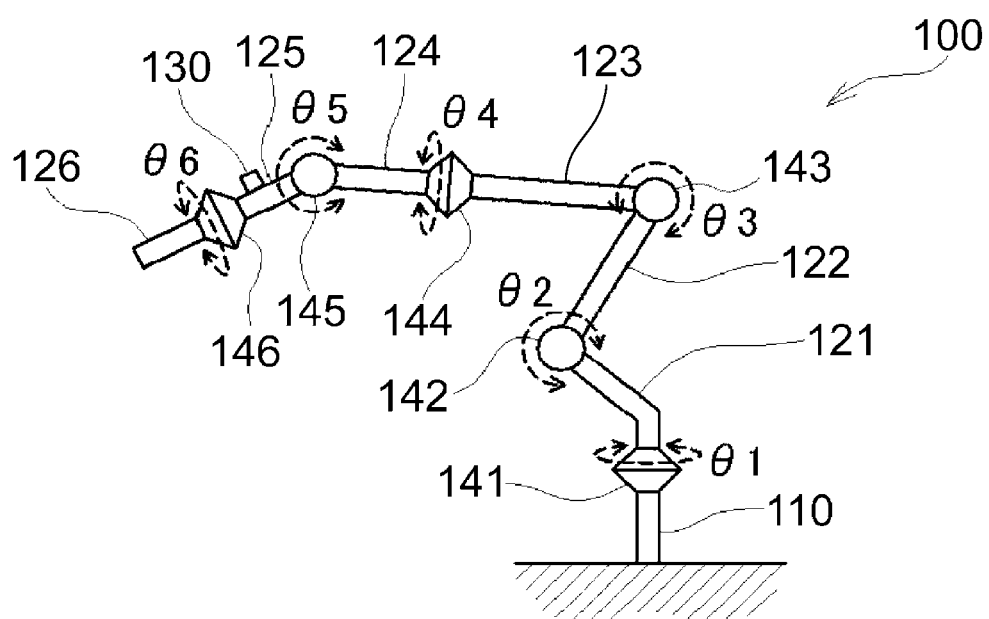
FIG. 22 is an explanatory diagram showing an example in which the gyro sensor is mounted on an arm member.

A position where the gyro sensor 130 is mounted in the robot 100 according to the second embodiment is not limited to the arm member 124 as long as the position is further on the base 110 side than the joint 146. The gyro sensor 130 may be mounted on the arm member 125 as shown in FIG. 22. In this case, the oscillation components of the joint 141 to the joint 145 are included in the output of the gyro sensor 130. Therefore, it is possible to feedback-control the first motor 141*m* to the fifth motor 145*m* of the joints 141 to 145 on the basis of the output of the gyro sensor 130.

Note that, when the fifth motor 145*m* of the joint 145 is feedback-controlled on the basis of the output of the gyro sensor 130, basically, control contents of the fifth motor control unit 155 only have to be the same as the control contents of the fourth motor control unit 154 explained above (see FIG. 19). When the gyro sensor 130 is mounted on the arm member 125, compared with when the gyro sensor 130 is mounted on the arm member 124, oscillation is amplified because the arm member 124 is further away from the base 110. Therefore, the detection accuracy of oscillation by the gyro sensor 130 is improved.

As a result, it is possible to more accurately perform the feedback control of the first motor 141m to the fourth motor 144m of the joints 141 to 144 for suppressing the oscillation of the arm 120.

Third Embodiment

Figure 23A:
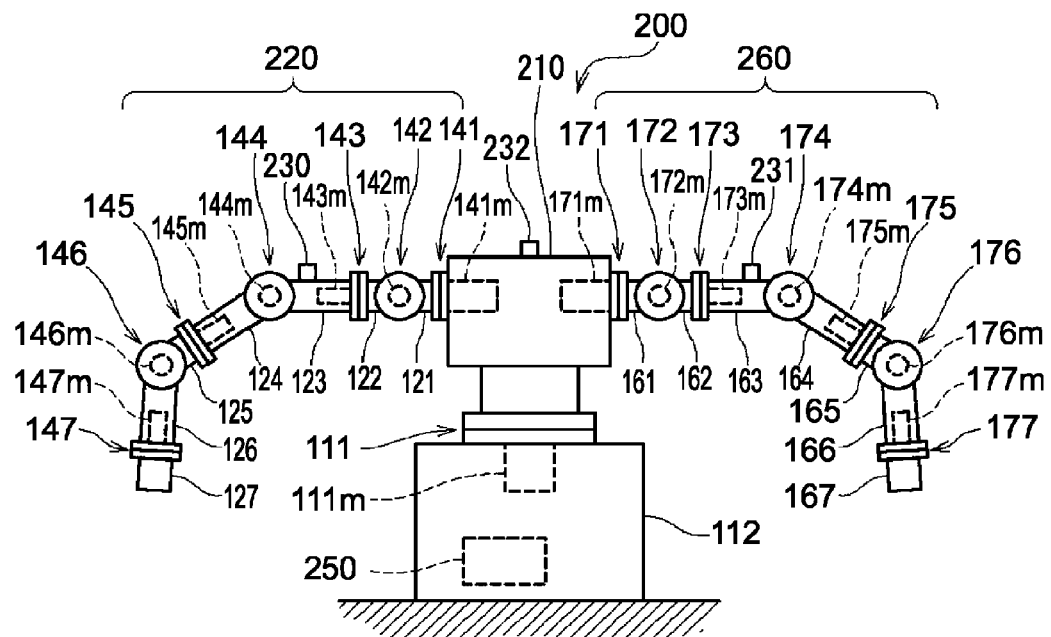
FIGS. 23A and 23B are explanatory diagrams showing the overall structure of a robot according to a third embodiment.
Figure 23B:
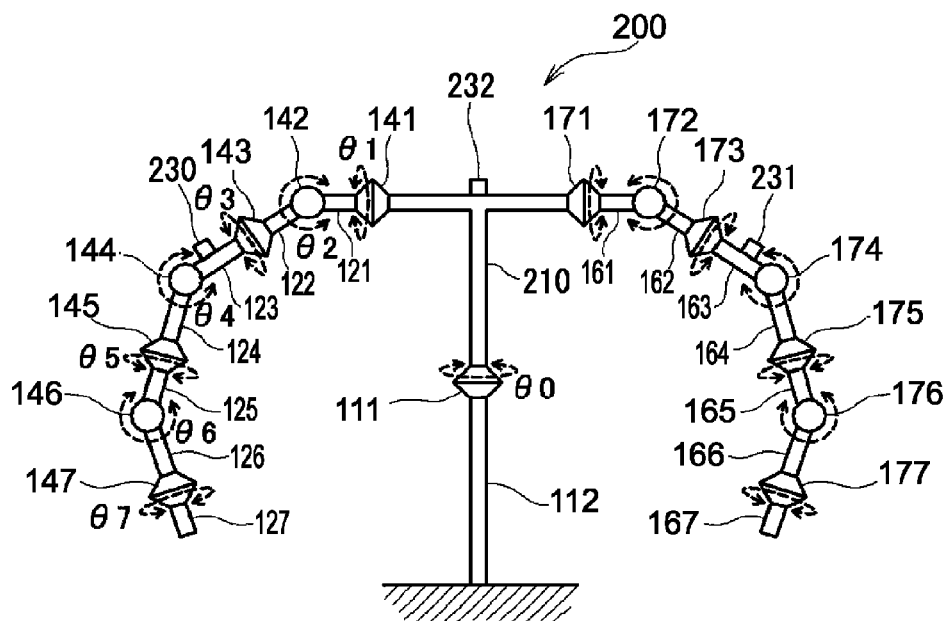

FIGS. 23A and 23B are explanatory diagrams showing the overall structure of a robot 200 according to a third embodiment. In FIG. 23A, a rough external shape of the robot 200 according to the third embodiment is shown. The robot 1 according to the first embodiment and the robot 100 according to the second embodiment are single-arm robots including only one arm 20 or 120. On the other hand, the robot 200 according to the third embodiment is a double-arm robot including a right arm 220 and a left arm 260.

In the following explanation, components same as the components in the first and second embodiments are denoted by the same reference numerals and signs and explanation of the components is sometimes omitted or simplified.

As shown in the figures, the robot 200 according to the third embodiment includes a main body 112 set on the ground and a base 210 turnable with respect to the main body 112 by a joint 111, and aright arm 220 and a left arm 260 are rotatably attached to the base 210.

In the main body 112, a control unit 250 that controls the operation of the entire robot 200 and a main body motor 111m for driving the joint 111 are mounted. A gyro sensor (a base gyro sensor) 232 is attached to the base 210. Like the gyro sensor 130 in the second embodiment, the gyro sensor 232 is capable of outputting angular velocities around three axes (an X axis, a Y axis, and a Z axis) set as rotation axes. The gyro sensor 232 is attached to set the Z axis in a direction coinciding with the direction of the rotation axis of the joint 111.

The right arm 220 includes seven arm members 121 to 127 and seven joints 141 to 147. The arm member 121 is turnably (twistably) attached to the base 210 by the joint 141. The arm member 122 is bendably attached to the arm member 121 by the joint 142. The arm member 123 is turnably (twistably) attached to the arm member 122 by the joint 143. The arm member 124 is bendably attached to the arm member 123 by the joint 144.

The arm member 125 is turnably (twistably) attached to the arm member 124 by the joint 145. The arm member 126 is bendably attached to the arm member 125 by the joint 146. The arm member 127 is turnably (twistably) attached to the arm member 126 by the joint 147.

Note that various jigs (end effectors) such as a robot hand are attached to the distal end of the arm member 127.

In the portions of the joints 141 to 147, a first motor 141m to a seventh motor 147m for driving the respective joints are mounted. Further, a gyro sensor (a right arm gyro sensor) 230 is attached to the arm member 123 among the arm members 121 to 127. The gyro sensor 230 in the third embodiment is attached to set any one of the three axes (the X axis, the Y axis, and the Z axis) in a direction coinciding with the direction of the rotation axis of the joint 143.

The left arm 260 is symmetrical to the right arm 220 with respect to the base 210. The left arm 260 includes seven arms 161 to 167 and seven joints 171 to 177. In the portions of the joints 171 to 177, motors 171m to 177m for driving the respective joints are mounted. A gyro sensor (a left arm gyro sensor) 231 is attached to the arm member 163 among the arm members 161 to 167. The left arm 260 is basically the same as the right arm 220. Therefore, the right arm 220 is explained as an example below. Note that, in the robot 200 according to the third embodiment, it is assumed that the right arm 220 and the left arm 260 are symmetrical. However, the right arm 220 and the left arm 260 do not always need to be symmetrical. The right arm 220 and the left arm 260 may include different configurations (e.g., include different numbers of arm members and joints).

In FIG. 23B, a positional relation among the main body 112, the joint 111, the base 210, the arm members 121 to 127 and the joints 141 to 147 of the right arm 220, and the arm members 161 to 167 and the joins 171 to 177 of the left arm 260 of the robot 200 according to the third embodiment is schematically shown.

As shown in FIG. 23B, an angle of the joint 111 is represented by rotation angle θ0, which is a rotation angle of the main body motor 111m. An angle of the joint 141 is represented by rotation angle θ1, which is a rotation angle of the first motor 141m. An angle of the joint 142 is represented by rotation angle θ2, which is a rotation angle of the second motor 142m. An angle of the joint 143 is represented by rotation angle θ3, which is a rotation angle of the third motor 143m. An angle of the joint 144 is represented by rotation angle θ4, which is a rotation angle of the fourth motor 144m. An angle of the joint 145 is represented by rotation angle θ5, which is a rotation angle of the fifth motor 145m. An angle of the joint 146 is represented by rotation angle θ6, which is a rotation angle of the sixth motor 146m. An angle of the joint 147 is represented by rotation angle θ7, which is a rotation angle of the seventh motor 147m.

Figure 24:
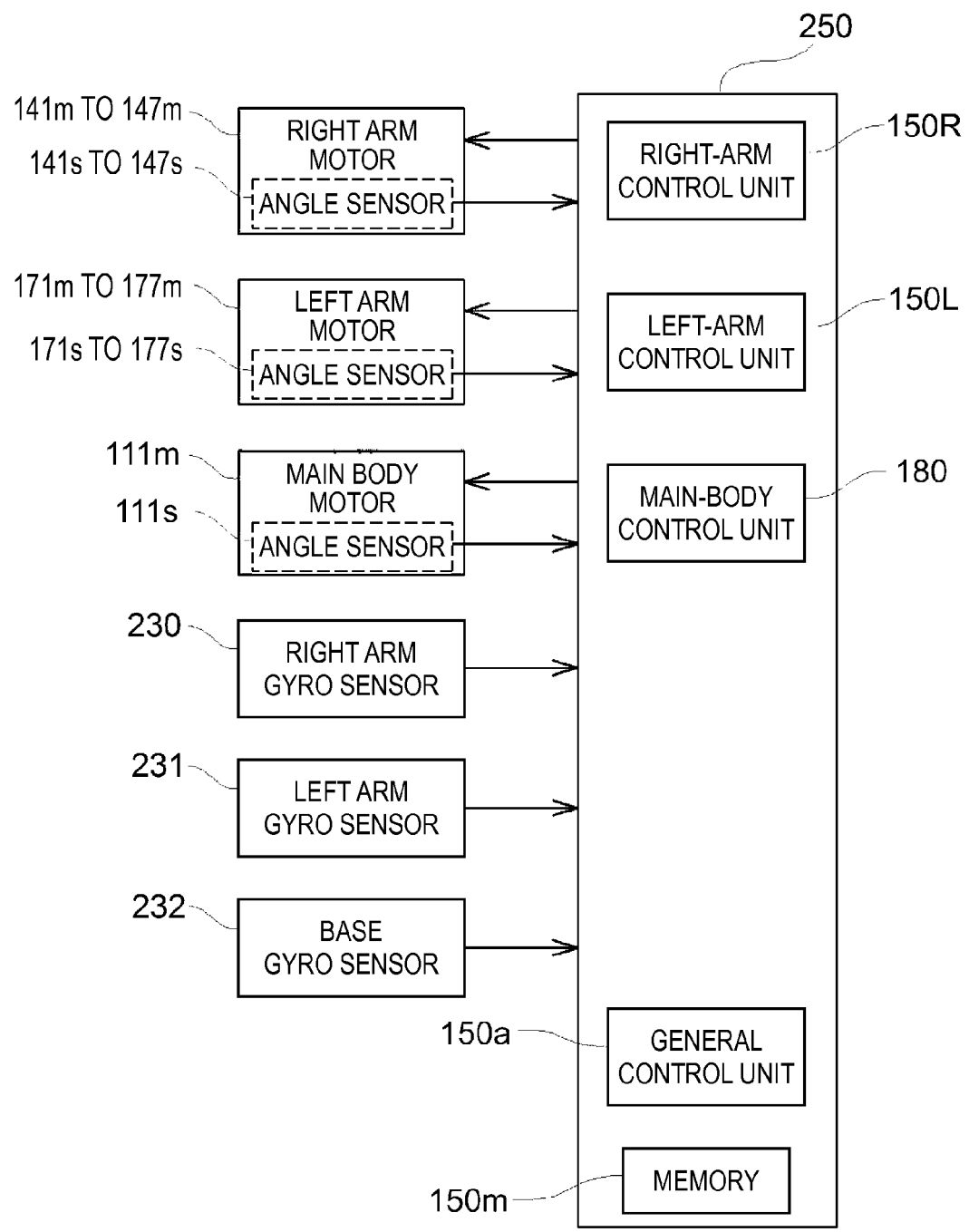
FIG. 24 is a block diagram showing the internal configuration of a control unit according to the third embodiment.

FIG. 24 is a block diagram showing the internal configuration of the control unit 250 in the third embodiment. As shown in the figure, the control unit 250 is mounted with, for example, a right-arm control unit 150R for controlling the first motor 141m to the seventh motor 147m of the right arm 220, a left-arm control unit 150L for controlling the first motor 171m to the seventh motor 177m of the left arm 260, a main-body control unit 180 for controlling the main body motor 111m, a general control unit 150a for controlling the operation of the entire robot 200, and a memory 150m having stored therein a control program and the like.

The first motor 141m to the seventh motor 147m of the right arm 220 are mounted with angle sensors 141s to 147s that detect rotation angles. Similarly, the first motor 171m to the seventh motor 177m of the left arm 260 are mounted with angle sensors 171s to 177s. The main body motor 111m is mounted with an angle sensor 111s. Outputs of the angle sensors 141s to 147s, 171s to 177s, and 111s are input to the control unit 250. Outputs of the gyro sensor 230 of the right arm 220, the gyro sensor 231 of the left arm 260, and the gyro sensor 232 of the base 210 are also input to the control unit 250. The right-arm control unit 150R, the left-arm control unit 150L, and the main-body control unit 180 control the operations of the motors on the basis of the outputs.

Figure 25:
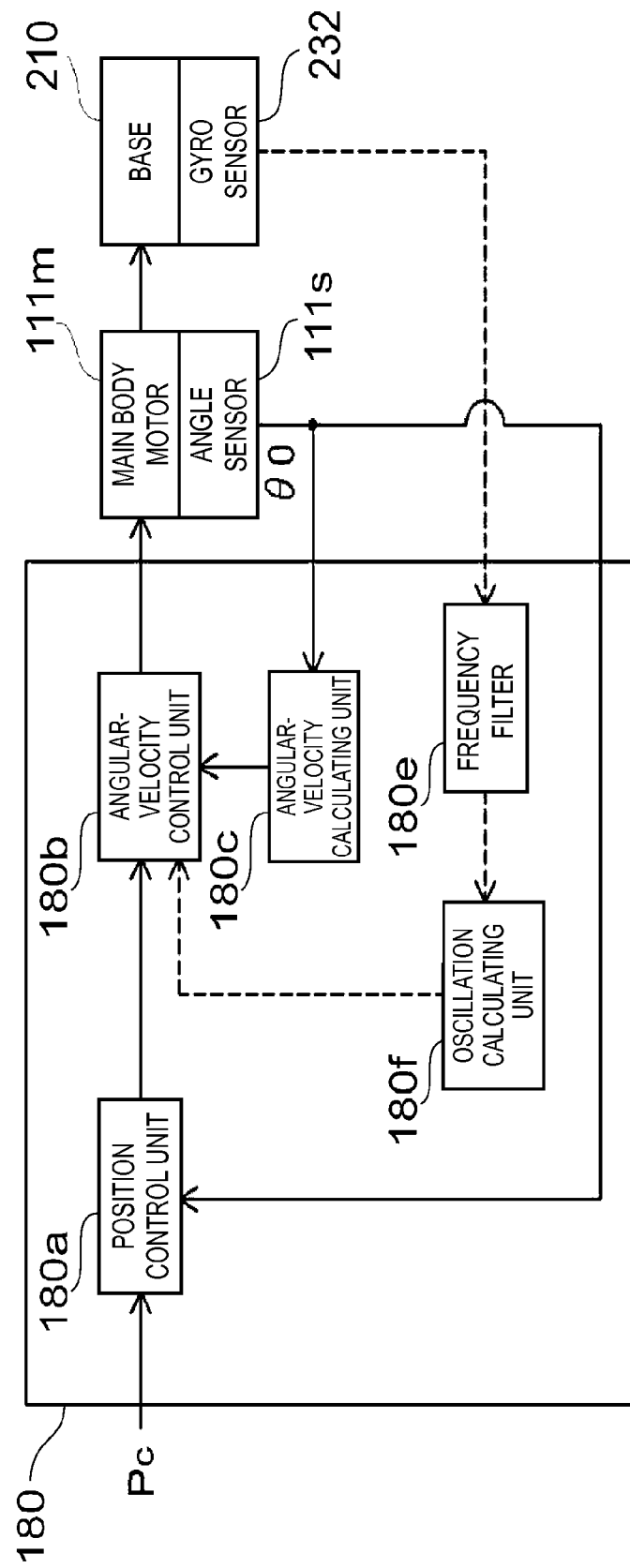
FIG. 25 is a block diagram showing control performed by a main body control unit.

FIG. 25 is a block diagram showing the control performed by the main-body control unit 180. The main-body control unit 180 performs position feedback control and angular velocity feedback control using the rotation angle θ0 detected by the angle sensor 111s and performs the angular velocity feedback control using the output of the gyro sensor 232. In FIG. 25, the position feedback control performed using the rotation angle θ0 is represented by solid line arrows. The angular velocity feedback control performed using the output of the gyro sensor 232 is represented by broken line arrows.

As shown in FIG. 25, the target position Pc received from the general control unit 150a and the rotation angle θ0 detected by the angle sensor 111s are input to a position control unit 180a. The position control unit 180a generates target angular velocity corresponding to a deviation between the target position Pc and the rotation angle θ0 and inputs the target angular velocity to an angular-velocity control unit 180b. After being input to an angular-velocity calculating unit 180c and converted into angular velocity, the rotation angle θ0 detected by the angle sensor 111s is input to the angular-velocity control unit 180b. The angular-velocity control unit 180b controls the operation of the main body motor 111m according to a deviation between the target angular velocity input from the position control unit 180a and the angular velocity input from the angular-velocity calculating unit 180c. Further, the output of the gyro sensor 232 is input to the angular-velocity control unit 180b via a frequency filter 180e and an oscillation calculating unit 180f and reflected on the control of the main body motor 111m.

The frequency filter 180e allows a frequency corresponding to the oscillation of the base 210 in the angular velocity output from the gyro sensor 232 to pass. Note that, instead of using the frequency filter 180e in order to obtain angular velocity corresponding to the oscillation of the base 210, the angular velocity may be calculated by subtracting the angular velocity of the joint 111 from the angular velocity output by the gyro sensor 232. Subsequently, the oscillation calculating unit 180f extracts an angular velocity component (oscillation angular velocity) around the rotation axis of the joint 111 from angular velocity having the frequency passed through the frequency filter 180e and inputs the angular velocity component to the angular-velocity control unit 180b. The angular-velocity control unit 180b controls the operation of the main body motor 111m to attenuate the oscillation angular velocity input from the oscillation calculating unit 180f.

When the angular-velocity control unit 180b controls the main body motor 111m in this way, the rotation angle θ0 detected by the angle sensor 111s changes and is input to the position control unit 180a, whereby the position feedback control is performed. The rotation angle θ0 is input to the angular-velocity control unit 180b via the angular-velocity calculating unit 180c, whereby the angular velocity feedback control is performed. The base 210 is rotated by the driving of the main body motor 111m, whereby the gyro sensor 232 outputs angular velocity. The output is input to the angular-velocity control unit 180b via the frequency filter 180e and the oscillation calculating unit 180f, whereby the angular velocity feedback control is performed.

Figure 26:
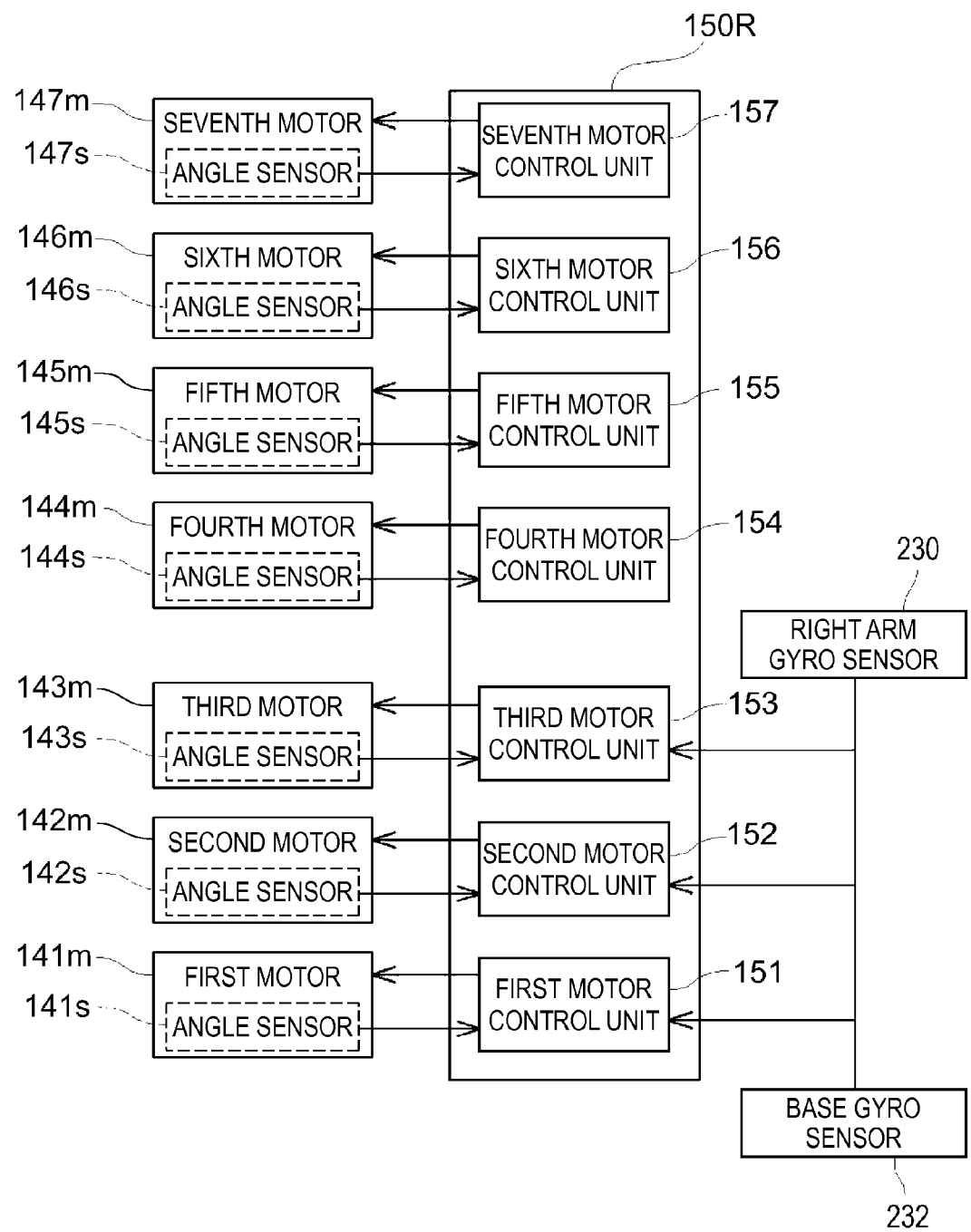
FIG. 26 is a block diagram showing the internal configuration of a right arm control unit according to the third embodiment.

FIG. 26 is a block diagram showing the internal configuration of the right-arm control unit 150R in the third embodiment. As shown in the figure, the right-arm control unit 150R are mounted with a first motor control unit 151 to a seventh motor control unit 157 (motor control units 151 to 157) for respectively controlling the first motor 141m to the seventh motor 147m (the motors 141m to 147m).

The respective motor control units 151 to 157 control the operations of the respective motors 141m to 147m on the basis of the rotation angles θ1 to θ7 detected by angle sensors 141s to 147s mounted on the first motor 141m to the seventh motor 147m set as control targets.

However, the first motor control unit 151 to the third motor control unit 153 (the first to third motor control units 151 to 153) control the operations of the first motor 141m to the third motor 143m using not only the rotation angles θ1 to θ3 detected by the angle sensors 141s to 143s corresponding to the motor control units but also outputs of the gyro sensor 230 of the right arm 220 and the gyro sensor 232 of the base 210.

The control performed by the motor control units 151 to 157 is explained below. However, since control contents of the fourth motor control unit 154 to the seventh motor control unit 157 in the third embodiment are basically the same as the control contents of the sixth motor control unit 156 in the second embodiment (see FIG. 18), explanation of the control contents is omitted.

Control targets of the first to third motor control units 151 to 153 are different from the control targets of the first motor 141m to the third motor 143m. However, control contents of the first to third motor control units 151 to 153 are basically the same as the control contents of the first motor 141m to the third motor 143m. Therefore, the control by the third motor control unit 153 is explained as an example.

Figure 27:
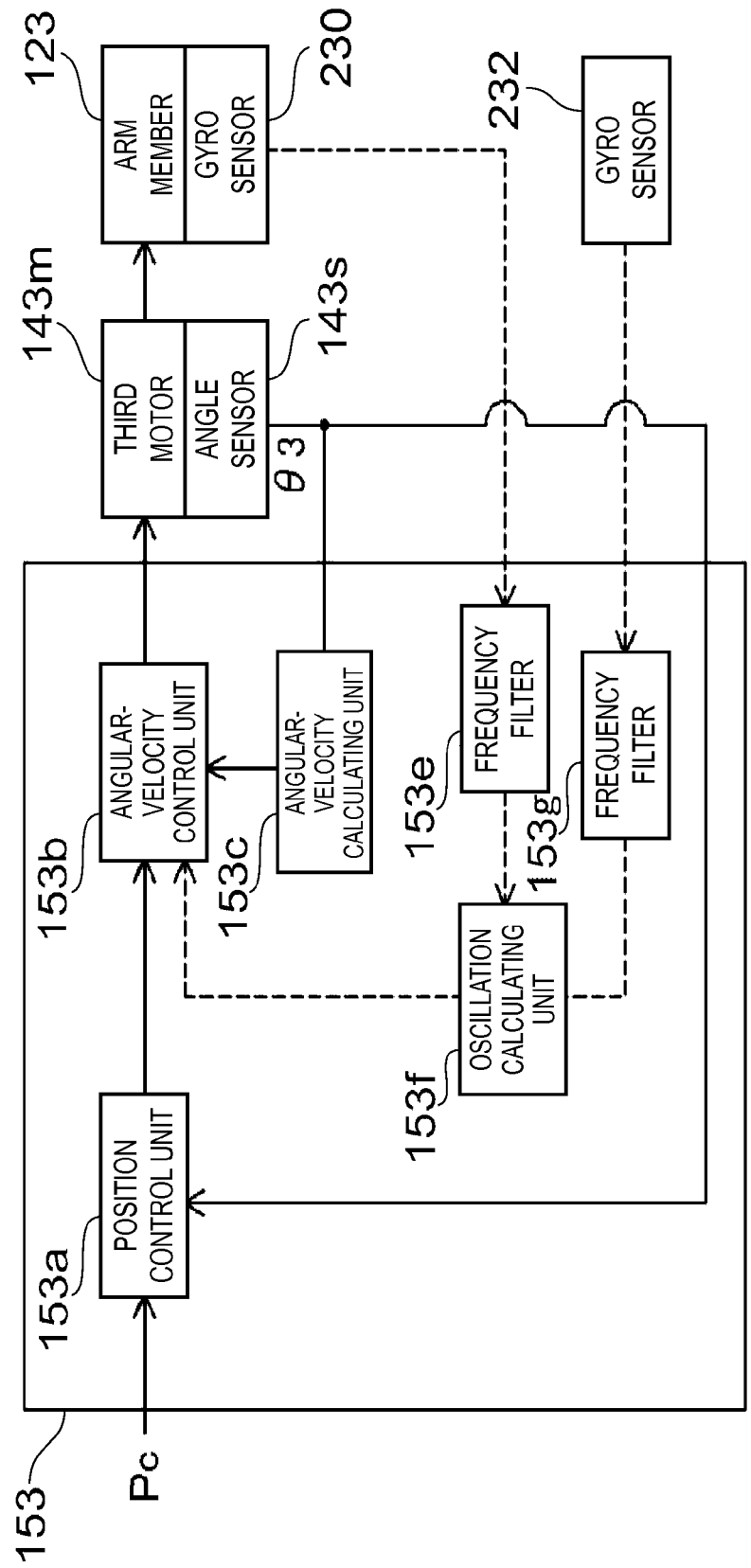
FIG. 27 is a block diagram showing control performed by a third motor control unit.

FIG. 27 is a block diagram showing the control performed by the third motor control unit 153. The third motor control unit 153 performs the position feedback control and the angular velocity feedback control using the rotation angle θ3 detected by the angle sensor 143s and performs the angular velocity feedback control using the outputs of the gyro sensor 230 and the gyro sensor 232. In FIG. 27, the position feedback control performed using the rotation angle θ3 is represented by solid line arrows. The angular velocity feedback control performed using the outputs of the gyro sensors 230 and 232 is represented by broken line arrows.

As shown in FIG. 27, the target position Pc received from the general control unit 150a and the rotation angle θ3 detected by the angle sensor 143s are input to a position control unit 153a. The position control unit 153a generates target angular velocity corresponding to a deviation between the target position Pc and the rotation angle θ3 and inputs the target angular velocity to an angular-velocity control unit 153b. After being input to an angular-velocity calculating unit 153c and converted into angular velocity, the rotation angle θ3 detected by the angle sensor 143s is input to the angular-velocity control unit 153b.

The angular-velocity control unit 153b controls the operation of the third motor 143m according to a deviation between the target angular velocity input from the position control unit 153a and the angular velocity input from the angular-velocity calculating unit 153c.

Further, the outputs from the gyro sensors 230 and 232 are input to the angular-velocity control unit 153b via frequency filters 153e and 153g and an oscillation calculating unit 153f and reflected on the control of the third motor 143m.

The frequency filter 153e allows a frequency corresponding to the oscillation of the arm member 123 in the angular velocity output from the gyro sensor 230 to pass. A frequency filter 153g allows a frequency corresponding to the oscillation of the base 210 in the angular velocity output from the gyro sensor 232 to pass. Oscillation components of the base 210 are also included in the output of the gyro sensor 230 mounted on the arm member 123. Therefore, the oscillation calculating unit 153f calculates oscillation components of the arm member 123 with respect to the base 210 by calculating a difference between angular velocity passed through the frequency filter 153e and angular velocity passed through the frequency filter 153g.

The oscillation calculating unit 153f extracts an angular velocity component (oscillation angular velocity) around the rotation axis of the joint 143 from the difference angular velocity and inputs the angular velocity component to the angular-velocity control unit 153b.

Note that, although not shown in the figure, the oscillation calculating unit 152f of the second motor control unit 152 extracts an angular velocity component around the rotation axis of the joint 142. The oscillation calculating unit 151f of the first motor control unit 151 extracts an angular velocity component around the rotation axis of the joint 141. The angular-velocity control unit 153b controls the operation of the third motor 143m to attenuate the oscillation angular velocity input from the oscillation calculating unit 153f.

When the angular-velocity control unit 153b controls the third motor 143m in this way, the rotation angle θ3 detected by the angle sensor 143s changes and is input to the position control unit 153a, whereby the position feedback control is performed. The rotation angle θ3 is input to the angular-velocity control unit 153b via the angular-velocity calculating unit 153c, whereby the angular velocity feedback control is performed. The arm member 123 is rotated by the driving of the third motor 143m, whereby the gyro sensor 230 outputs angular velocity. The output is input to the angular-velocity control unit 153b via the frequency filter 153e and the oscillation calculating unit 153f, whereby the angular velocity feedback control is performed.

As explained above, in the robot 200 according to the third embodiment, the gyro sensor 230 is mounted on the arm member 123 further on the base 210 side than the third joint 145 counted from the base 210 side among the twisting joints (the joint 141, the joint 143, the joint 145, and the joint 147) turnable in a direction in which the right arm 220 is twisted. Therefore, as in the second embodiment, the oscillation of the right arm 220 is not amplified by the feedback control based on the output of the gyro sensor 230. It is possible to quickly suppress the oscillation of the right arm 220 compared with when the feedback control is not performed.

In the robot 200 according to the third embodiment in which the base 210 is turnable with respect to the main body 112, the oscillation of the base 210 can be suppressed by the feedback control based on the output of the gyro sensor 232 mounted on the base 210. The oscillation of the arm member 123 with respect to the base 210 can be detected on the basis of the output of the gyro sensor 230 mounted on the arm member 123 and the output of the gyro sensor 232 mounted on the base 210. Therefore, the detection of the oscillation of the arm member 123 is less easily affected by the oscillation of the base 210. It is possible to quickly suppress the oscillation of the right arm 220 compared with when only the output of the gyro sensor 230 is used. As a result, it is possible to improve work efficiency of the robot 200.

A position where the gyro sensor 230 of the right arm 220 is mounted in the robot 200 according to the third embodiment is not limited to the arm member 123 as long as the position is further on the base 210 side than the joint 145. For example, the gyro sensor 230 may be mounted on the arm member 124. In this case, the oscillation components of the joint 141 to the joint 144 are included in the output of the gyro sensor 230. Therefore, it is possible to feedback-control the first motor 141m to the fourth motor 144m (the first to fourth motors 141m to 144m) of the joints 141 to 144 on the basis of the output of the gyro sensor 230.

By feedback-controlling the first to fourth motors 141m to 144m of the four joints 141 to 144 in this way, it is possible to more finely suppress the oscillation of the right arm 220. Note that, when the fourth motor 144m of the joint 144 is feedback-controlled on the basis of the output of the gyro sensor 230, control contents of the fourth motor control unit 154 only have to be the same as the control contents of the third motor control unit 153 (see FIG. 27).

The embodiments of the invention are explained above. However, the invention is not limited to the embodiments or the modifications. It is possible to carry out the invention in various forms without departing from the spirit of the invention.

For example, embodiments of the invention include the following.

A robot comprising: an arm including a first joint and a second joint that has a rotation axis in a direction different from a direction of a rotation axis of the first joint; an inertial sensor provided in the arm; and a control unit configured to control the first joint by sampling an output of the inertial sensor at a cycle equal to or higher than 100 Hz.

A robot comprising: an arm including a first joint and a second joint that has a rotation axis in a direction different from a direction of a rotation axis of the first joint; an inertial sensor provided in the arm; and a force sensor provided further on the distal end side of the arm than the inertial sensor.

A robot comprising: an arm including a first joint provided on a base and a second joint that has a rotation axis in a direction different from a direction of a rotation axis of the first joint; and an inertial sensor provided in the arm, wherein when the first joint is turned 90° at angular acceleration of 2200°/s², time until oscillation of the distal end of the arm changes from −0.05 mm to +0.05 mm is equal to or shorter than 1 second.

A robot comprising: an arm including a first joint provided on a base and a second joint that has a rotation axis in a direction different from a direction of a rotation axis of the first joint; and an inertial sensor provided in the arm, wherein when the first joint is turned 90° at maximum angular acceleration, time until oscillation of the distal end of the arm changes from −0.05 mm to +0.05 mm is equal to or shorter than 1 second.

A robot comprising: an arm including a first joint provided on a base and a second joint that has a rotation axis in a direction different from a direction of a rotation axis of the first joint; and an inertial sensor provided in the arm, wherein when the first joint is turned 90° at angular acceleration of 2200°/s², time until oscillation of the distal end of the arm changes from −0.1 mm to +0.1 mm is equal to or shorter than 0.5 second.

A robot comprising: an arm including a first joint provided on a base and a second joint that has a rotation axis in a direction different from a direction of a rotation axis of the first joint; and an inertial sensor provided in the arm, wherein when the first joint is turned 90° at maximum angular acceleration, time until oscillation of the distal end of the arm changes from −0.05 mm to +0.05 mm is equal to or shorter than 1 second.

The entire disclosure of Japanese Patent Application Nos. 2014-025127, filed Feb. 13, 2014 and 2013-248935, filed Dec. 2, 2013 are expressly incorporated by reference herein.

What is claimed is:

1. A robot comprising:
   an arm including a first joint and a second joint that has a rotation axis in a direction different from a direction of a rotation axis of the first joint;
   a controller controlling the movement of the arm; and
   a first angular velocity sensor provided to the arm,
      wherein when the first joint is turned 90° at an angular acceleration of 2200° per second squared, a time until oscillation of a distal end of the arm changes from −0.05 millimeters to +0.05 millimeters is equal to or shorter than one second.

2. The robot according to claim 1, wherein
   the arm includes a plurality of arm members including a first arm member, the first angular velocity sensor is provided to the first arm member, and a second angular velocity sensor is provided to an arm member different from the first arm member among the plurality of arm members.

3. The robot according to claim 1, further comprising a control unit configured to feedback-control, on the basis of an output of the first angular velocity sensor.

4. The robot according to claim 2, further comprising a control unit configured to perform feedback-control based on an output of the first angular velocity sensor.

5. The robot according to claim 2, further comprising a control unit configured to perform feedback-control based on an output of the second angular velocity sensor.

6. The robot according to claim 3, wherein the control unit is configured to control the first joint by sampling an output of the first angular velocity sensor at a cycle equal to or higher than 100 Hz.

7. The robot according to claim 4, wherein the control unit is configured to control the first joint by sampling an output of the first angular velocity sensor at a cycle equal to or higher than 100 Hz.

8. The robot according to claim 5, wherein the control unit is configured to control the first joint by sampling an output of the first angular velocity sensor at a cycle equal to or higher than 100 Hz.

9. The robot according to claim 1, further comprising a first angle sensor provided to the first joint, wherein the controller communicates with the first angular velocity sensor, the first angle sensor, the first joint, and the second joint to control the arm, the controller determines a target position and calculates a target angular velocity from the target position and a rotation angle of the first joint, the controller determines a correction value based on the target angular velocity, the output from the first angle sensor, and the output of the first angular velocity sensor, the controller determines an angular velocity feedback value based on the correction value and the output of the first angular velocity sensor, and the controller feedback controls the output of the angular velocity sensor from the angular velocity feedback value to suppress the oscillation of a distal end of the arm.

* * * * *